US012112007B2

(12) United States Patent
Kim et al.

(10) Patent No.: US 12,112,007 B2
(45) Date of Patent: Oct. 8, 2024

(54) ELECTRONIC PANEL AND ELECTRONIC APPARATUS INCLUDING THE SAME

(71) Applicant: Samsung Display Co., Ltd., Yongin-si (KR)

(72) Inventors: Jung-Yun Kim, Yongin-si (KR); Youngchan Kim, Yongin-si (KR); Seung-Jae Sung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/341,516

(22) Filed: Jun. 26, 2023

(65) Prior Publication Data

US 2024/0004506 A1  Jan. 4, 2024

(30) Foreign Application Priority Data

Jun. 29, 2022 (KR) .......................... 10-2022-0079591

(51) Int. Cl.
*G06F 3/044* (2006.01)
(52) U.S. Cl.
CPC .......... *G06F 3/0446* (2019.05); *G06F 3/0445* (2019.05)
(58) Field of Classification Search
CPC ............................. G06F 3/0446; G06F 3/0445
See application file for complete search history.

(56) References Cited

U.S. PATENT DOCUMENTS

| | | | |
|---|---|---|---|
| 10,310,653 B2 | 6/2019 | Kim et al. | |
| 11,004,371 B2 | 5/2021 | Lee et al. | |
| 11,282,420 B2 | 3/2022 | Han et al. | |
| 2020/0173949 A1* | 6/2020 | Lee | G06F 3/04164 |
| 2021/0173505 A1* | 6/2021 | Choi | G06F 3/0448 |

FOREIGN PATENT DOCUMENTS

| | | |
|---|---|---|
| CN | 111258456 A | 6/2020 |
| CN | 112328112 A | 2/2021 |
| KR | 10-2018-0061883 A | 6/2018 |
| KR | 10-2020-0051099 A | 5/2020 |
| KR | 10-2020-0065189 A | 6/2020 |

* cited by examiner

*Primary Examiner* — Kevin M Nguyen
(74) *Attorney, Agent, or Firm* — Lewis Roca Rothgerber Christie LLP

(57) ABSTRACT

An electronic apparatus including a display unit having a signal transmission region, an active region surrounding at least a portion of the signal transmission region, and a peripheral region adjacent to the active region, and an input sensor including sensing electrodes each having a plurality of sensing electrode patterns which overlap the active region and a sensing circuit having a sensing pattern overlapping the signal transmission region and a sensing line connected to the sensing pattern, and on the display unit, wherein a hole passing through the display unit and the input sensor is defined to correspond to the signal transmission region, and in a plan view, a portion of the sensing pattern either overlaps the floating pattern or is between the sensing electrode patterns and the floating pattern, and the other portion of the sensing pattern is between the floating pattern and the hole.

19 Claims, 19 Drawing Sheets

ELECTRONIC PANEL AND ELECTRONIC APPARATUS INCLUDING THE SAME

CROSS-REFERENCE TO RELATED APPLICATION

The present application claims priority to and the benefit of Korean Patent Application No. 10-2022-0079591, filed on Jun. 29, 2022, the entire content of which is hereby incorporated by reference.

BACKGROUND

1. Field

Aspects of some embodiments of the present disclosure herein relate to an electronic apparatus.

2. Description of the Related Art

An electronic apparatus is activated by an electrical signal. An electronic apparatus generally includes various electronic components such as an electronic panel and an electronic module. The electronic panel may include a display unit configured to display images, or an input sensor configured to sense external input (e.g., a touch input). The electronic components may be electrically connected to each other by signal lines arranged in various manners.

The display unit includes a light emitting element which generates an image. The input sensor may include sensing electrodes for sensing an external input. The sensing electrodes are located in an active region. The input sensor is designed to provide uniform sensitivity to the front surface of the active region.

The above information disclosed in this Background section is only for enhancement of understanding of the background and therefore the information discussed in this Background section does not necessarily constitute prior art.

SUMMARY

Aspects of some embodiments of the present disclosure herein relate to an electronic apparatus, and for example, to an electronic apparatus including an input sensor which has a through hole and senses an external input.

Aspects of some embodiments of the present disclosure include an electronic apparatus capable of easily determining whether there is a crack or the like generated in the electronic panel when forming a hole.

Aspects of some embodiments of the present disclosure may also include an electronic apparatus capable of easily determining whether or not sensing electrode patterns included in an input sensor are defective or whether or not an insulation layer including an organic material is defective.

According to some embodiments of the inventive concept, an electronic apparatus including a display unit including a base substrate having a signal transmission region, an active region surrounding at least a portion of the signal transmission region, and a peripheral region adjacent to the active region, pixels on the base substrate and overlapping the active region, an organic pattern overlapping the signal transmission region, and a floating pattern extended along an edge of the organic pattern, and an input sensor including sensing electrodes each having a plurality of sensing electrode patterns which overlap the active region and a sensing circuit having a sensing pattern overlapping the signal transmission region and a sensing line connected to the sensing pattern, and on the display unit, wherein a hole passing through the display unit and the input sensor is defined to correspond to the signal transmission region, and, on a plane (or in a plan view), a portion of the sensing pattern either overlaps the floating pattern or is between the sensing electrode patterns and the floating pattern, and the other portion of the sensing pattern is between the floating pattern and the hole.

According to some embodiments, the sensing pattern may include extension portions each of which surrounds at least a portion of the hole and which are spaced apart from each other and connection portions for connecting the extension portions, wherein among the extension portions, a first group extension portion included in the portion includes a first extension portion surrounding the left side of the hole and a second extension portion surrounding the right side of the hole, and, among the extension portions, a second group extension portion included in the other portion includes, on a plane (or in a plan view), a third extension portion between the first extension portion and the hole, a fourth extension portion between the second extension portion and the hole, and a fifth extension portion among the third extension portion, the fourth extension portion, and the hole.

According to some embodiments, the connection portions may include a first connection portion connected to one end of each of the first extension portion and the third extension portion, a second connection portion connected to one end of each of the second extension portion and the fourth extension portion and facing the first connection portion, a third connection portion connected to the other end of the third extension portion and one end of the fifth extension portion, and a fourth connection portion connected to the other end of the fourth extension portion and the other end of the fifth extension portion and facing the third connection portion.

According to some embodiments, the sensing line may include a first line connected to the other end of the first extension portion and a second line connected to the other end of the second extension portion.

According to some embodiments, the input sensor may include trace lines respectively connected to the sensing electrodes and sensing pads connected to the sensing line and the trace lines, respectively, wherein the first line and the second line are connected to different sensing pads.

According to some embodiments, the first connection portion and the second connection portion may cross the floating pattern.

According to some embodiments, the sensing electrode patterns may include main patterns and adjacent patterns having an area smaller than that of the main patterns and surrounding the hole, wherein the input sensor further includes a compensation line connected to the adjacent patterns spaced apart from each other having the hole interposed therebetween among the adjacent patterns and in the signal transmission region, wherein the first group extension portion is more adjacent to the compensation line than the second group extension portion.

According to some embodiments, the sensing electrode patterns, the sensing pattern, and the compensation line may be on the same layer.

According to some embodiments, the sensing electrode patterns may include a plurality of conductive lines crossing each other, wherein a sensing line overlapping the active region among the sensing lines includes a plurality of conducive lines crossing each other.

According to some embodiments, the display unit may include a circuit element layer including at least one transistor included in each of the pixels, and a dam portion overlapping the signal transmission region and surrounding the hole, and on the base substrate, a display element layer including light emitting elements included in each of the pixels and connected to the at least one transistor, and on the circuit element layer, and an encapsulation layer including a first inorganic layer, a second inorganic layer, and an organic layer between the first inorganic layer and the second inorganic layer and having the boundary thereof defined by the dam portion, and covering the light emitting elements.

According to some embodiments, some of the sensing patterns may be spaced apart from the organic layer on a plane (e.g., in a plan view), and the others of the sensing patterns may overlap the organic layer on a plane (e.g., in a plan view).

According to some embodiments, the input sensor may include an intermediate insulation layer on the second inorganic layer, a first sensing insulation layer on the intermediate insulation layer, a second sensing insulation layer on the first sensing insulation layer, and a third sensing insulation layer on the second sensing insulation layer, wherein the organic pattern is between the intermediate insulation layer and the first sensing insulation layer, and the sensing electrode patterns are on the second sensing insulation layer and covered by the third sensing insulation layer.

According to some embodiments, the floating pattern may be on the first sensing insulation layer and covered by the second sensing insulation layer.

According to some embodiments, the hole may have any one of a quadrangular shape, a circular shape, and an elliptical shape.

According to some embodiments, the signal transmission region comprises a panel transmission region and a second signal transmission region spaced apart from each other, wherein the hole overlaps the panel transmission region, and an additional hole passing through the display unit and the input sensor is defined to correspond to the second signal transmission region, wherein the input sensor further includes an additional sensing pattern connected to the sensing line and surrounding at least a portion of the additional hole.

According to some embodiments, the shape of the hole and the shape of the additional hole may be different from each other.

According to some embodiments, the electronic apparatus may further include an electronic module overlapping the hole, wherein the electronic module includes at least one of a camera, a speaker, a light sensing sensor, or a heat sensing sensor.

According to some embodiments of the inventive concept, an electronic apparatus includes a display unit including a base substrate having a signal transmission region, an active region surrounding at least a portion of the signal transmission region, and a peripheral region adjacent to the active region, insulation layers on the base substrate, pixels in the active region, and an encapsulation layer including inorganic layers and an organic layer between the inorganic layers and covering the pixels, and an input sensor including sensing electrodes each having a plurality of sensing electrode patterns which overlap the active region and a sensing circuit having a sensing pattern overlapping the signal transmission region and a sensing line connected to the sensing pattern, and on the display unit, wherein a hole passing through the display unit and the input sensor is defined to correspond to the signal transmission region, and on a plane (e.g., in a plan view) some of the sensing patterns overlap the organic layer, and the others of the sensing patterns do not overlap the organic layer.

According to some embodiments, the sensing electrode patterns may include main patterns and adjacent patterns having an area smaller than that of the main patterns and surrounding the hole, wherein the input sensor further includes a compensation line connected to the adjacent patterns spaced apart from each other having the hole interposed therebetween among the adjacent patterns and in the signal transmission region, wherein the some of the sensing patterns overlapping the organic layer are more adjacent to the compensation line than the others of the sensing patterns.

According to some embodiments, the sensing electrode patterns, the sensing pattern, and the compensation line may be on the same layer.

BRIEF DESCRIPTION OF THE DRAWINGS

The accompanying drawings are included to provide a further understanding of the inventive concept, and are incorporated in and constitute a part of this specification. The drawings illustrate aspects of some embodiments of the inventive concept and, together with the description, serve to explain principles of the inventive concept. In the drawings.

DETAILED DESCRIPTION

Figure 1A:
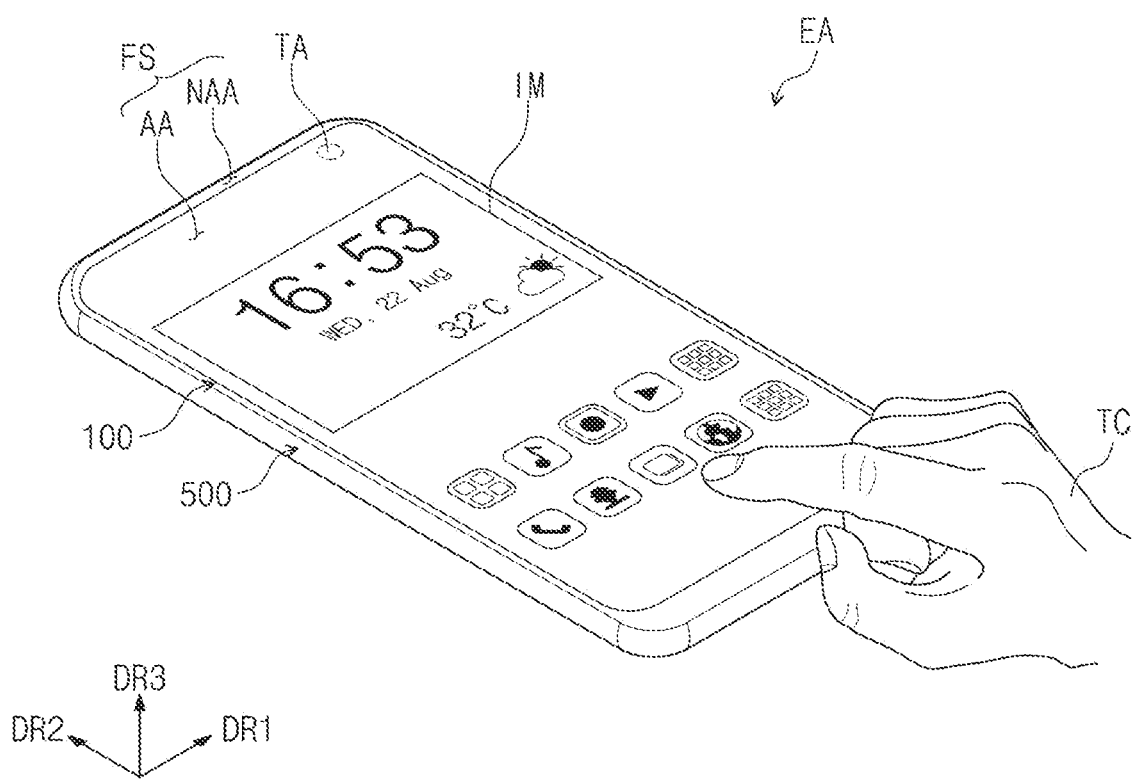
FIG. 1A is an assembled perspective view of an electronic apparatus according to some embodiments of the inventive concept.

In the present disclosure, when an element (or a region, a layer, a portion, and the like) is referred to as being "on," "connected to," or "coupled to" another element, it means that the element may be directly located on/connected to/coupled to the other element, or that a third element may be located therebetween.

Like reference numerals refer to like elements. Also, in the drawings, the thickness, the ratio, and the dimensions of elements are exaggerated for an effective description of technical contents. The term "and/or," includes all combinations of one or more of which associated components may define.

It will be understood that, although the terms "first," "second," etc. may be used herein to describe various elements, these elements should not be limited by these terms. These terms are only used to distinguish one element from another. For example, a first element may be referred to as a second element, and a second element may also be referred to as a first element in a similar manner without departing the scope of rights of the present invention. The terms of a singular form may include plural forms unless the context clearly indicates otherwise.

In addition, terms such as "below," "lower," "above," "upper," and the like are used to describe the relationship of the components shown in the drawings. The terms are used as a relative concept and are described with reference to the direction indicated in the drawings.

It should be understood that the term "comprise," or "have" is intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present invention pertains. It is also to be understood that terms such as terms defined in commonly used dictionaries should be interpreted as having meanings consistent with the meanings in the context of the related art, and should not be interpreted in too ideal a sense or an overly formal sense unless explicitly defined herein.

Hereinafter, embodiments of the inventive concept will be described in more detail with reference to the accompanying drawings.

Figure 1B:
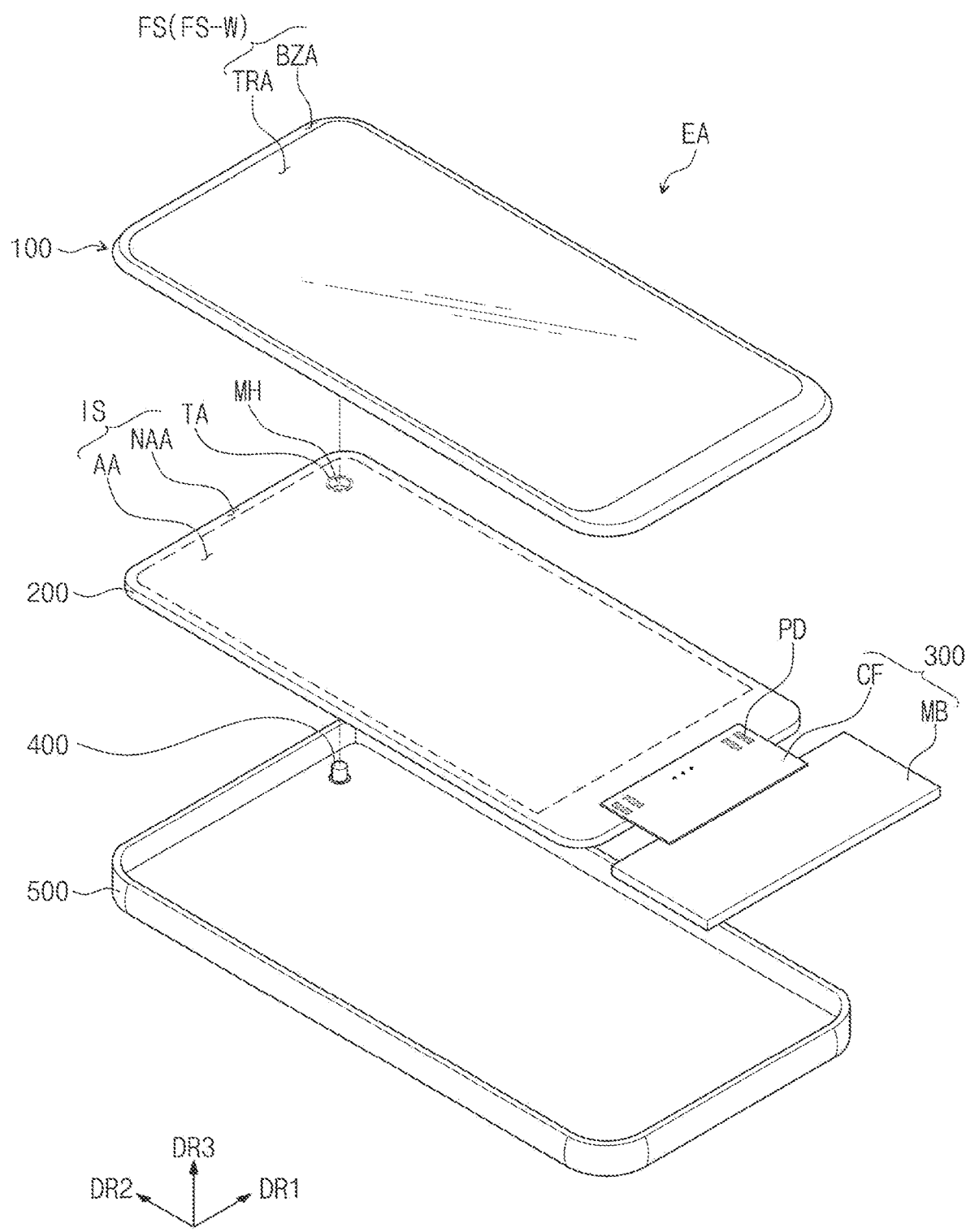
FIG. 1B is an exploded perspective view of an electronic apparatus according to some embodiments of the inventive concept.
Figure 2:
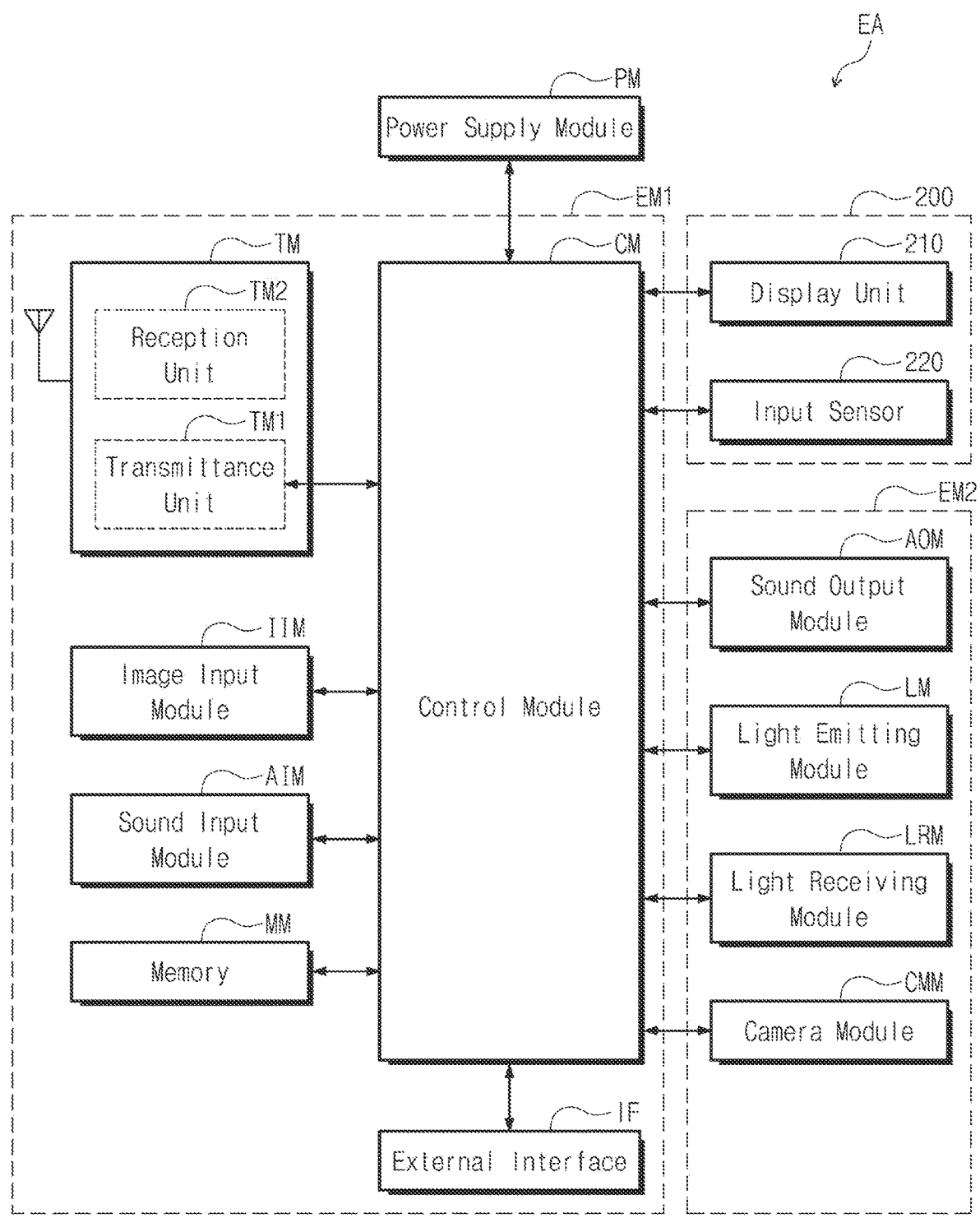
FIG. 2 is a block diagram of an electronic apparatus according to some embodiments of the inventive concept.

FIG. 1A is an assembled perspective view of an electronic apparatus according to some embodiments of the inventive concept. FIG. 1B is an exploded perspective view of an electronic apparatus according to some embodiments of the inventive concept. FIG. 2 is a block diagram of an electronic apparatus according to some embodiments of the inventive concept.

As illustrated in FIG. 1A, an electronic apparatus EA may display an image IM on a front surface FS. The front surface FS may be defined to be parallel to a plane defined by a first direction DR1 and a second direction DR2. The front surface FS includes an active region AA and a peripheral region NAA which is adjacent to the active region AA.

The electronic apparatus EA displays the image IM in the active region AA. The image IM may include at least any one of a still image and a dynamic image. In FIG. 1A, as an example of the image IM, a watch and a plurality of icons are illustrated.

The active region AA may have a quadrangular shape parallel to each of the first direction DR1 and the second direction DR2. However, this is only an example. The active region AA may have various shapes, and is not limited to any particular shape.

The peripheral region NAA is adjacent to the active region AA. The peripheral region NAA may surround the active region AA (e.g., in a periphery, or outside a footprint of the active region AA). However, this is only illustrated as an example. The peripheral region NAA may be located adjacent to only one side of the active region AA, or may be omitted.

A normal direction of the front surface FS may correspond to a thickness direction DR3 (hereinafter, a third direction) of the electronic apparatus EA. According to some embodiments, a front surface (or an upper surface) and a rear surface (or a lower surface) of each member are defined on the basis of a direction in which the image IM is displayed. The front surface and the rear surface may oppose each other in the third direction DR3.

Meanwhile, directions indicated by the first to third directions DR1, DR2, and DR3 are a relative concept, and may be converted to different directions.

The electronic apparatus EA according to the inventive concept may sense a user input TC applied from the outside. The user input TC includes external inputs in various forms such as a part of a user's body, light, heat, or pressure. Also, the electronic apparatus EA may sense not only an input contacting the electronic apparatus EA but also an input in close proximity therewith or adjacent thereto.

According to some embodiments, the user input TC is illustrated as a user's hand applied to a front surface FS. However, this is only an example. As described above, the user input TC may be provided in various forms, and also, the electronic apparatus EA may sense the user input TC applied to a side surface or a rear surface of the electronic apparatus EA depending on the structure of the electronic apparatus EA, but embodiments according to the present disclosure are not limited thereto.

The electronic apparatus EA according to some embodiments may be folded with respect to a reference axis extended in a direction (e.g., a set or predetermined direction). The electronic apparatus EA may be operated in an inner-folding state in which the front surfaces FS face each other in a folded state, or may be operated in an outer-folding state in which external cases 500 face each other in the folded state. In addition, with respect to two reference axes, some parts may operate in the inner-folding state, and other parts may operate in the outer-folding state, but the embodiments of the inventive concept are not limited thereto.

The electronic apparatus EA may include a window 100, an electronic panel 200, a circuit board 300, an electronic module 400, and an external case 500. The window 100 and the external case 500 are coupled to define the appearance of the electronic apparatus EA.

The window 100 is located on the electronic panel 200 and covers an entire surface IS of the electronic panel 200. The window 100 may include an optically transparent insulation material. For example, the window 100 may include glass or plastic. The window 100 may have a multi-layered structure or a single-layered structure. For example, the window 100 may have a laminated structure in which a plurality of plastic films are adhered to each other with an adhesive, or a laminated structure in which a glass substrate and a plastic film are adhered to each other with an adhesive.

The window 100 includes a front surface FS-W which is exposed to the outside. The front surface FS of the electronic apparatus EA may substantially be defined by the front surface FS-W of the window 100.

The window 100 may include a light transmitting region TRA and a bezel region BZA. The light transmitting region TRA may be an optically transparent region.

The light transmitting region TRA of the window 100 may have a shape corresponding to an active region AA of the electronic panel 200. For example, the light transmitting region TRA overlaps a front surface or at least a portion of the active region AA. The image IM displayed on the active region AA of the electronic panel 200 may be visually recognized from the outside through the light transmitting region TRA.

The bezel region BZA may be a region having relatively low light transmittance compared to the light transmitting region TRA. The bezel region BZA defines the shape of the light transmitting region TRA. The bezel region BZA is adjacent to the light transmitting region TRA, and may surround the light transmitting region TRA.

The bezel region BZA may have a color (e.g., a set or predetermined color). When the window 100 is provided as a glass or plastic substrate, the bezel region BZA may be a color layer printed or a color layer deposited on one surface of the glass or plastic substrate. Alternatively, the bezel region BZA may be formed by coloring a corresponding region of the glass or plastic substrate.

The bezel region BZA may cover the peripheral region NAA of the electronic panel 200 to prevent the peripheral region NAA from being visually recognized from the outside. Meanwhile, this is only illustrated as an example, and in the window 100 according to some embodiments of the inventive concept, the bezel region BZA may be omitted.

The electronic panel 200 may include a display units 210 and an input sensor 220. The display unit 210 may be a component which substantially generates the image IM. The image IM generated by the display unit 210 is visually recognized by a user from the outside through the active region AA. The input sensor 220 senses an external input TC applied from the outside. The input sensor 220 may sense the external input TC which is provided to the window 100.

The electronic panel 200 includes the entire surface IS including the active region AA and the peripheral region NAA. The active region AA may be a region activated by an electrical signal.

The active region AA may be a region in which the image IM is displayed, and at the same time, may be a region in which the external input TC is sensed. The active region AA overlaps at least the light transmitting region TRA. For example, the active region AA overlaps a front surface or at least a portion of the light transmitting region TRA.

Accordingly, a user may visually recognize the image IM provided through the active region AA, or may provide the external input TC to the active region AA. However, this is only illustrated as an example. In the active region AA, a region in which the image IM is displayed and a region in which the external input TC is sensed may be separated from each other, but the embodiments of the inventive concept are not limited thereto.

The peripheral region NAA may be a region covered by the bezel region BZA. The peripheral region NAA is adjacent to the active region AA. The peripheral region NAA may surround the active region AA. In the peripheral region NAA, a driving circuit, a driving line, or the like for driving the active region AA may be located.

In the peripheral region NAA, various signal lines, pads PD, electronic elements, or the like for providing an electrical signal to the active region AA may be located. The peripheral region NAA may be covered by the bezel region BZA, and thus, may not be visually recognized from the outside.

According to some embodiments, the electronic panel 200 is assembled in a flat state in which the active region AA and the peripheral region NAA face toward the window 100. However, this is only an example. A portion of the peripheral region NAA in the electronic panel 200 may be bent. At this time, the portion of the peripheral region NAA faces toward the rear surface of the electronic apparatus EA, so that the peripheral region NAA on the front surface of the electronic apparatus EA may be reduced. Alternatively, the electronic panel 200 may be assembled in a state in which a portion of the active region AA is also bent. Alternatively, in the electronic panel 200 according to some embodiments of the inventive concept, the peripheral region NAA may be omitted.

According to some embodiments, the electronic panel 200 may include a signal transmission region TA surrounded by the active region AA. The signal transmission region TA may be a region having relatively high light transmittance than the active region AA.

According to some embodiments, the electronic panel 200 may have a hole MH defined therein. The hole MH may be defined through the electronic panel 200 so as to correspond to the signal transmission region TA. Therefore, the hole MH may be defined through the display unit 210 and the input sensor 220. In the present disclosure, "to correspond to" does not mean having the same shape or same area on a plane (e.g., in a plan view). When in a relationship of overlapping each other on a plane (e.g., in a plan view), the relationship may be expressed as "to correspond to."

Because the hole MH is defined in the signal transmission region TA, the signal transmission region TA may have relatively high light transmittance compared to the active region AA. FIG. 1B illustrates one hole MH having a circular shape, but the embodiments of the inventive concept are not limited thereto. The position, number, and shape of the hole MH may vary.

The circuit board 300 may be connected to the electronic panel 200. The circuit board 300 may include a flexible circuit board CF and a main circuit board MB. The flexible circuit board CF may include an insulation film and conductive lines mounted on the insulation film. The conductive lines are connected to the pads PD to electrically connect the circuit board 300 and the electronic panel 200.

According to some embodiments, the flexible circuit board CF may be assembled in a bent state. Accordingly, the main circuit board MB is located on the rear surface of the electronic panel 200 and be stably housed in a space provided by the external case 500. Meanwhile, according to some embodiments, the flexible circuit board CF may be omitted, and at this time, the main circuit board MB may be directly connected to the electronic panel 200.

The main circuit board MB may include signal lines and electronic elements according to some embodiments. The electronic elements may be connected to the signal lines to be electrically connected to the electronic panel 200. The electronic elements generate various electrical signals, for example, a signal to generate the image IM or a signal to sense the external input TC, or process a sensed signal. Meanwhile, the main circuit board MB may be provided in plurality corresponding to each electrical signal for generation and processing, but embodiments according to the present disclosure are not limited thereto.

Meanwhile, in the electronic apparatus EA according to some embodiments of the inventive concept, a driving circuit configured to provide an electrical signal to the active region AA may be directly mounted on the electronic panel 200. At this time, the driving circuit may be mounted in the form of a chip, or may be formed together with pixels PX (see FIG. 3A). At this time, the area of the circuit board 300 may be reduced or omitted. The electronic apparatus EA of the inventive concept may include various embodiments, and is not limited to any one embodiment.

The electronic module 400 is located on a lower side of the window 100. The electronic module 400 corresponds to the signal transmission region TA, and may overlap the hole MH on a plane (e.g., in a plan view). The electronic module 400 may receive an external input transmitted through the signal transmission region TA or may provide an output through the signal transmission region TA.

In the electronic module 400, a reception unit configured to receive an external input or an output unit configured to provide an output may overlap the signal transmission region TA on a plane (e.g., in a plan view). Some or all of the electronic module 400 may be housed in the signal transmission region TA. According to the inventive concept, the electronic module 400 is arranged to overlap the active region AA, and thus, may prevent an increase in the peripheral region NAA.

Referring to FIG. 2, the electronic apparatus EA may include the electronic panel 200, a power supply module PM, a first electronic module EM1, and a second electronic module EM2. The electronic panel 200, the power supply module PM, the first electronic module EM1, and the second electronic module EM2 may be electrically connected to each other. In FIG. 2, the display unit 210 and the input sensor 220 among components of the electronic panel 200 are illustrated as an example.

The first electronic module EM1 and the second electronic module EM2 include various functional modules for operating the electronic apparatus EA. The first electronic module EM1 may be directly mounted on a mother board electrically connected to the electronic panel 200, or may be mounted on a separate substrate and electrically connected to the mother board through a connector and the like.

The first electronic module EM1 may include a control module CM, a wireless communication module TM, an image input module IIM, a sound input module AIM, a memory MM, and an external interface IF. Some of the modules may not be mounted on the mother board, but instead, may be electrically connected to the mother board through a flexible printed circuit board.

The control module CM controls the overall operation of the electronic apparatus EA. The control module CM may be a microprocessor. For example, the control module CM either activates or deactivates the electronic panel 200. The control module CM may control other modules, such as the image input module IIM or the sound input module AIM, on the basis of a touch signal received from the electronic panel 200.

The wireless communication module TM may transmit/receive wireless signals with other terminals using Bluetooth or a Wi-Fi line. The wireless communication module TM may transmit/receive voice signals using a general communication line. The wireless communication module TM includes transmittance unit TM1 for modulating and transmitting a signal to be transmitted, and a reception unit TM2 for demodulating a received signal.

The image input module IIM processes an image signal and converts the processed image signal into image data displayable on the electronic panel 200. The sound input module AIM receives an external sound signal through a microphone in a recording mode, a voice recognition mode, and the like, and converts the received external sound signal into electrical voice data.

The external interface IF serves as an interface to be connected to an external charger, a wired/wireless data port, a card socket (for example, a memory card, a SIM/UIM card), and the like.

The second electronic module EM2 may include a sound output module AOM, a light emitting module LM, a light receiving module LRM, a camera module CMM, and the like. The above components may be directly mounted on the mother board, or may be mounted on a separate substrate and electrically connected to the electronic panel 200 through a connector and the like, or electrically connected to the first electronic module EM1.

The sound output module AOM converts sound data received from the wireless communication module TM or sound data stored in the memory MM and outputs the converted sound data to the outside.

The light emitting module LM generates and outputs light. The light emitting module LM may output an infrared ray. For example, the light emitting module LM may include an LED element. For example, the light receiving module LRM may sense an infrared ray. The light receiving module LRM may be activated when an infrared ray of a level (e.g., a set or predetermined level or threshold) or higher is sensed. The light receiving module LRM may include a CMOS sensor. After generated infrared light is output from the light emitting module LM, the infrared light is reflected by an external object (such as a user's finger or face) and the reflected infrared light may be incident on the light receiving module LRM. The camera module CMM captures an external image.

The electronic module 400 according to some embodiments of the inventive concept may include at least one of components of the first electronic module EM1 and the second electronic module EM2. For example, the electronic module 400 may include at least one of a camera, a speaker, a light sensing sensor, or a heat sensing sensor. The electronic module 400 may sense an external object received through the signal transmission region TA, or may provide a sound signal such as voice to the outside through the signal transmission region TA. In addition, the electronic module 400 may include a plurality of components, but embodiments according to the present disclosure are not limited thereto.

The electronic module 400 arranged to overlap the signal transmission region TA may easily visually recognize an external object through the signal transmission region TA, or an output signal generated by the electronic module 400 may be easily transmitted to the outside.

According to the inventive concept, the electronic module 400 may be assembled to overlap the active region AA on a plane (e.g., in a plan view). Accordingly, the increase in the peripheral region NAA due to the housing of the electronic module 400 is prevented to improve the aesthetics of the electronic apparatus EA.

Figure 3A:
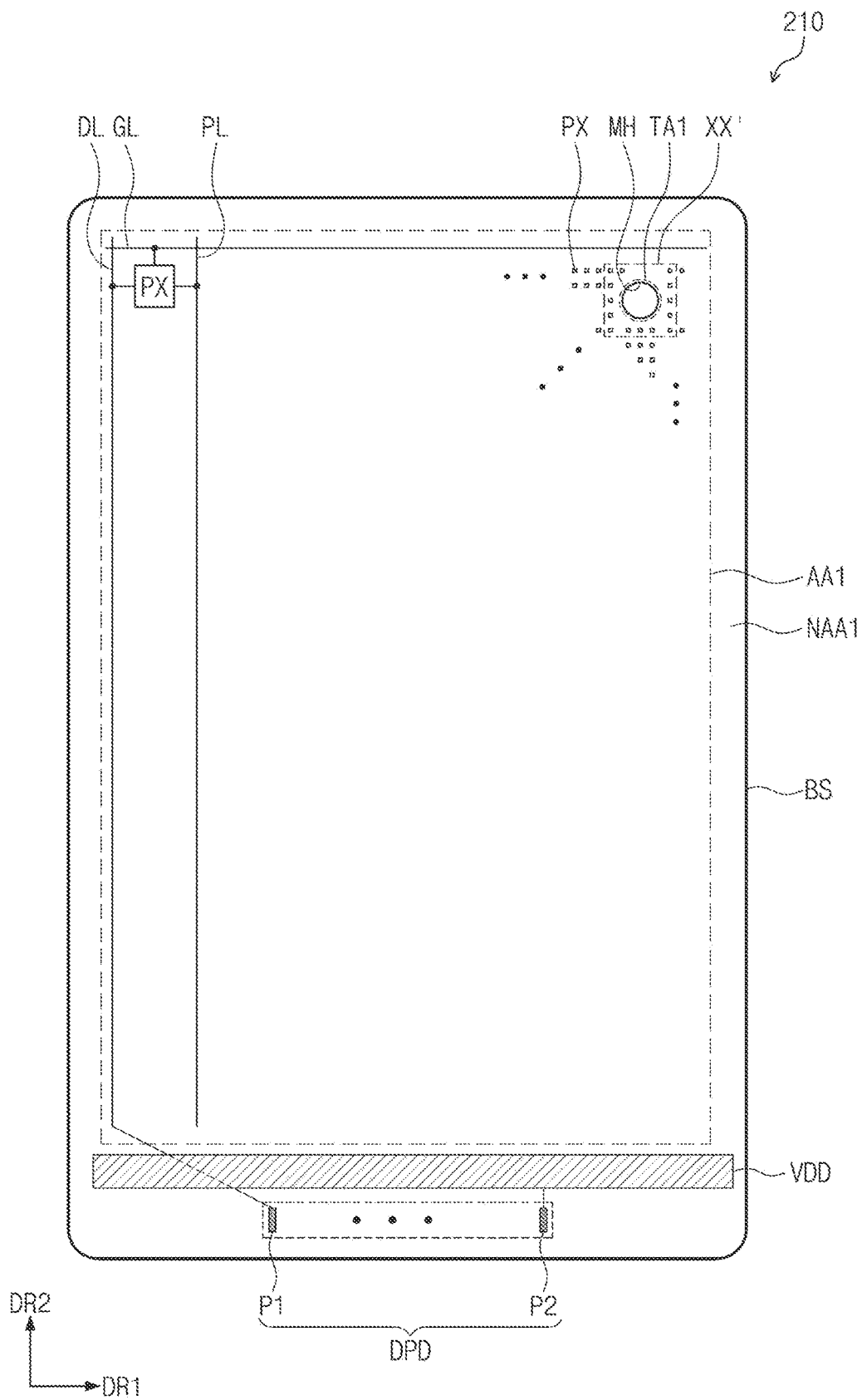
FIG. 3A is a plane view of a display unit according to some embodiments of the inventive concept.
Figure 3B:
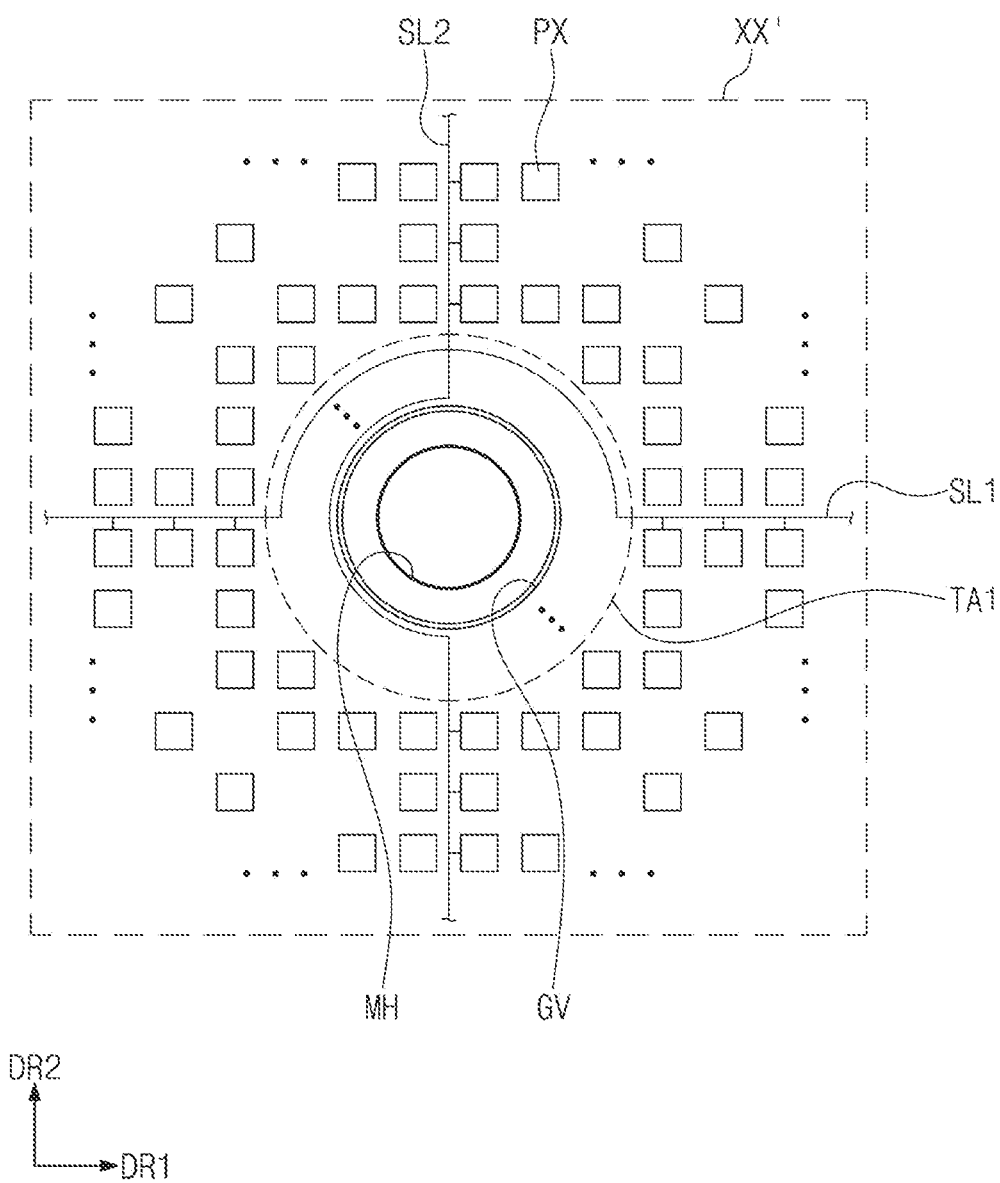
FIG. 3B is an enlarged view of some regions illustrated in FIG. 3A.
Figure 3C:
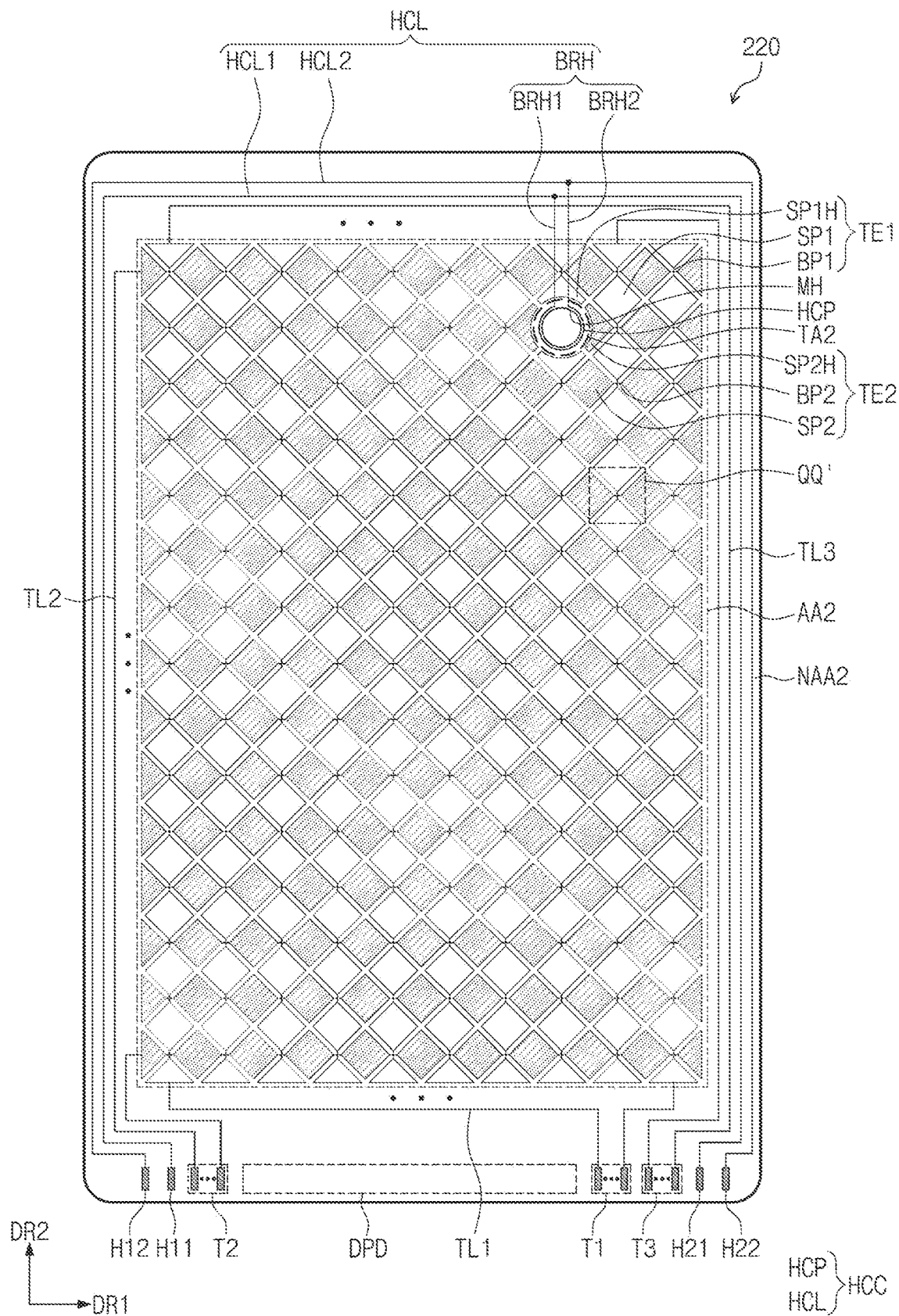
FIG. 3C is a plan view of an input sensor according to some embodiments of the inventive concept.
Figure 3D:
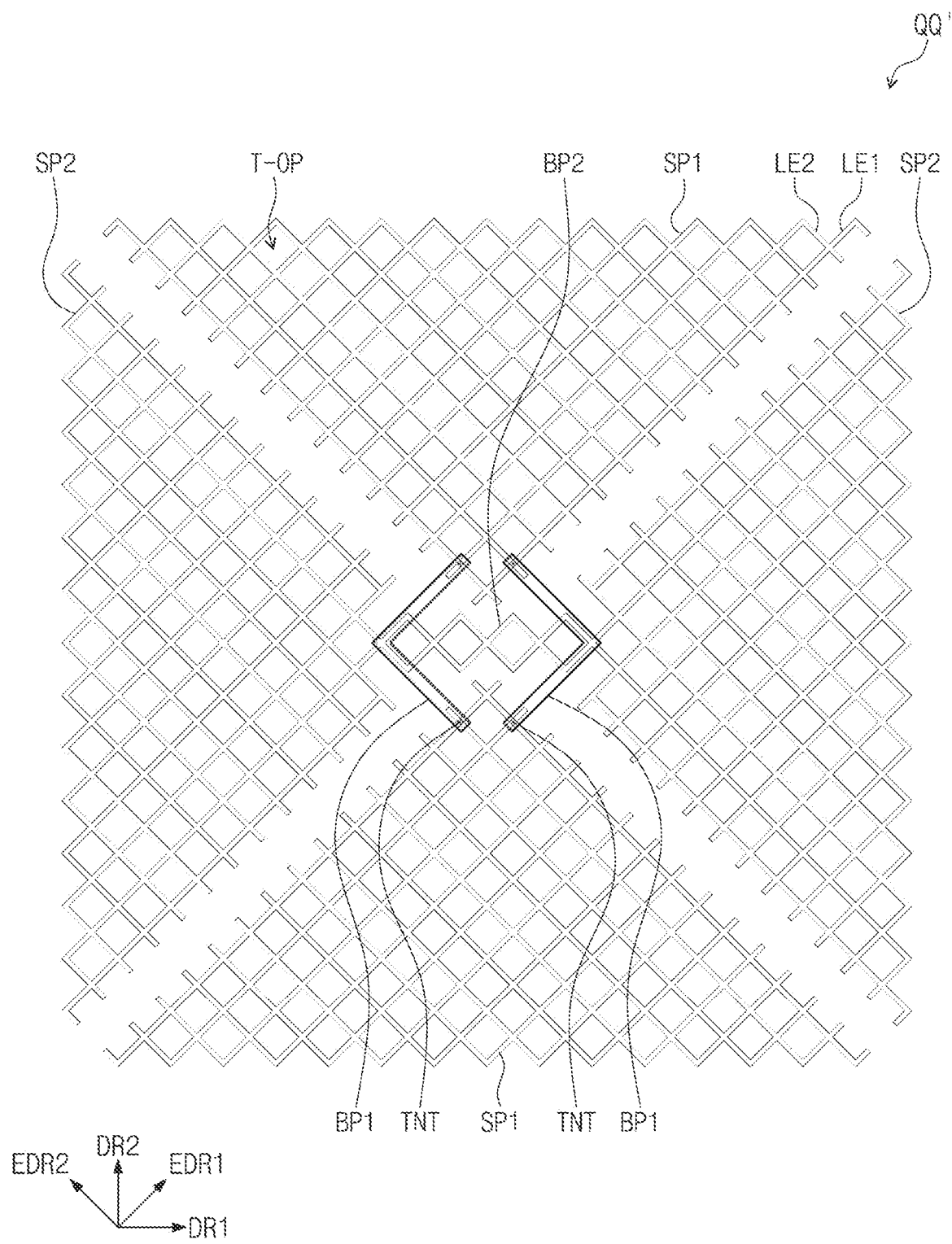
FIG. 3D is an enlarged view of region QQ' illustrated in FIG. 3C.

FIG. 3A is a plane view of a display unit according to some embodiments of the inventive concept. FIG. 3B is an enlarged view of region XX' illustrated in FIG. 3A. FIG. 3C is a plan view of an input sensor according to some embodiments of the inventive concept. FIG. 3D is an enlarged view of region QQ' illustrated in FIG. 3C.

As illustrated in FIG. 3A, the display unit 210 may include a base substrate BS, a plurality of pixels PX, a plurality of signal lines (GL, DL, and PL), and a plurality of display pads DPD.

A panel transmission region TA1, a first active region AA1, and a first peripheral region NAA1 may be regions provided by the base substrate BS. The base substrate BS may include an insulation substrate. For example, the base substrate BS may be composed of a glass substrate, a plastic substrate, or a combination thereof.

The signal lines GL, DL, and PL are connected to the pixels PX and transmit electrical signals to the pixels PX. Among the signal lines included in the display unit 210, a scan line GL, a data line DL, and a power line PL are merely illustrated as an example. However, this is only an example. The signal lines GL, DL, and PL may further include at least one of other power line, an initialization voltage line, or a light emission control line, and are not limited to any one embodiment.

Each of the pixels PX may include transistors, a capacitor, and a light emitting element. One of the transistors may be a switching transistor. The switching transistor may be a switching element configured to control on-off of the pixel PX. The switching transistor may transmit or block a data signal transmitted through the data line DL in response to a scan signal transmitted through the scan line GL.

The capacitor is connected to the switching transistor and the power line PL. The capacitor charges the amount of charge corresponding to the difference between a data signal transmitted from the switching transistor and a first power signal applied to the power line PL.

One of the transistors may be a driving transistor. The driving transistor is connected to the switching transistor, the capacitor, and the light emitting element. The driving transistor controls a driving current flowing in the light emitting element in correspondence to the amount of charge stored in the capacitor. According to the amount of charge charged in the capacitor, the turn-on time of the driving transistor may be determined. During the turn-on time, the driving transistor provides the first power signal transmitted through the power line PL to the light emitting element.

The light emitting element may generate light or control the amount of light according to an electrical signal. For example, the light emitting element may include an organic light emitting element, a quantum dot light emitting element, an electrophoretic element, or an electro wetting element.

The light emitting element is connected to a power pattern VDD to receive a power signal (hereinafter, a second power signal) different from the first power signal provided by the power line PL. In the light emitting element, a driving current corresponding to the difference between an electrical signal provided from the driving transistor and the second power signal flows, and the light emitting element may generate light corresponding to the driving current. Meanwhile, this is only illustrated as an example, and each of the pixels PX may include electronic elements having various configurations and arrangements, and is not limited to any one embodiment.

Some pixels PX of the pixels PX are arranged around the hole MH, and may surround the hole MH on a plane (e.g., in a plan view). FIG. 3B illustrates the panel transmission region TA1 with dotted lines for ease of description.

The hole MH may be defined in the first active region AA1. Accordingly, at least some of the pixels PX may be located adjacent to the hole MH. Some of the pixels PX may surround the hole MH. Hereinafter, referring to FIG. 3B, the pixels PX arranged around the hole MH are described.

Referring to FIG. 3B, in the panel transmission region TA1, a recessed pattern (e.g., a set or predetermined recessed pattern) GV may be defined. The recessed pattern GV is arranged along the edge of the hole MH on a plane (e.g., in a plan view), and is illustrated in a circular ring shape surrounding the hole MH according to some embodiments, although embodiments according to the present disclosure are not limited thereto.

However, this is only illustrated as an example, and the recessed pattern GV may correspond to the hole MH, or may have a different shape. In addition, the recessed pattern GV may have a closed line shape including a square, an ellipse, or at least a portion of a curve, or may be provided in a shape including a plurality of partially disconnected patterns, but embodiments according to the present disclosure are not limited thereto, and the recessed pattern GV may have various shapes without departing from the spirit and scope of embodiments according to the present disclosure.

The recessed pattern GV corresponds to a portion recessed from a front surface of the display unit 210, and blocks a path through which moisture or oxygen, which may penetrate through the hole MH, is introduced to the pixel PX. A detailed description thereof will be described in more detail later.

In the panel transmission region TA1, a plurality of signal lines SL1 and SL2 connected to the pixels PX may be located. The signal lines SL1 and SL2 are connected to the pixels PX via the panel transmission region TA1. In FIG. 3B, for ease of description, a first signal line SL1 and a second signal line SL2 among the plurality of signal lines connected to the pixels PX are described for illustration purposes.

The first signal line SL1 is extended along the first direction DR1. The first signal line SL1 is connected to pixels in the same row which are arranged along the first direction DR1 among the pixels PX. The first signal line SL1 is illustratively described to correspond to the scan line GL.

Some of the pixels PX connected to the first signal line SL1 are located on the left side of the hole MH, and the others thereof are located on the right side of the hole MH. Accordingly, pixels PX in the same row which are connected to the first signal line SL1 may be turned on/off by substantially the same gate signal even when some pixels PX are omitted around the hole MH.

The second signal line SL2 is extended along the second direction DR2. The second signal line SL2 is connected to pixels in the same column which are arranged along the second direction DR2 among the pixels PX. The second signal line SL2 is described to correspond to the data line DL as an example.

Some of the pixels PX connected to the second signal line SL2 are located on the upper side of the hole MH, and the others thereof are located on the lower side of the hole MH. Accordingly, pixels PX in the same column which are connected to the second signal line SL2 may receive a data signal through the same line even when some pixels PX are omitted around the hole MH.

Meanwhile, the display unit 210 according to some embodiments of the inventive concept may further include a connection pattern located in the panel transmission region TA1. The first signal line SL1 may be disconnected in a region overlapping the panel transmission region TA1. Disconnected portions of the first signal line SL1 may be connected through the connection pattern. In the same manner, the second signal line SL2 may be disconnected in a region overlapping the panel transmission region TA1, and a connection pattern for connecting disconnected portions of the second signal line SL2 may be further provided.

Referring back to FIG. 3A, the power pattern VDD is located in the first peripheral region NAA1. According to some embodiments, the power pattern VDD is connected to a plurality of other power lines. Accordingly, the display unit 210 may provide the same second power signal to the plurality of pixels PX by including the power pattern VDD.

The display pads DPD may include a first pad P1 and a second pad P2. The first pad P1 may be provided in plurality and respectively connected to the data lines DL. The second pad P2 may be connected to the power pattern VDD and electrically connected to the power line PL. The display unit 210 may provide electrical signals provided from the outside through the display pads DPD to the pixels PX. Meanwhile, the display pads DPD may further include pads for receiving other electrical signals in addition to the first pad P1 and the second pad P2, but are not limited to any one embodiment.

Referring to FIG. 3C, the input sensor 220 is located on the display unit 210. The input sensor 220 may sense the external input TC (see FIG. 1A) to obtain information on the position or intensity of the external input TC. The input sensor 220 includes a plurality of first sensing electrodes TE1, a plurality of second sensing electrodes TE2, a plurality of trace lines TL1, TL2, and TL3, and a plurality of sensing pads T1, T2, and T3.

The first sensing electrodes TE1 and the second sensing electrodes TE2 are located in a second active region AA2. The input sensor 220 may obtain information on the external input TC through a change in capacitance between the first sensing electrodes TE1 and the second sensing electrodes TE2.

The second active region AA2 may correspond to the first active region AA1 of the display unit 210, and the second peripheral region NAA2 may correspond to the first peripheral region NAA1 of the display unit 210. In addition, a sensing transmission region TA2 of the input sensor 220 may overlap the panel transmission region TA1 of the display unit 210 to define the signal transmission region TA (see FIG. 1B) of the electronic panel 200 (see FIG. 1B). Therefore, in the present disclosure, a composition overlapping the sensing transmission region TA2 may be described to overlap the signal transmission region TA.

The first sensing electrodes TE1 are arranged along the first direction DR1, and each thereof is extended along the second direction DR2. The first sensing electrodes TE1 may each include first main patterns SP1, first adjacent patterns SP1H, and first bridge patterns BP1.

The first main patterns SP1 are located in the second active region AA2. The first main patterns SP1 are arranged to be spaced apart from the hole MH. The first main patterns SP1 have a shape (e.g., a set or predetermined shape), and has a first area. According to some embodiments, each of the first main patterns SP1 may have a rhombic shape. However, this is only illustrated as an example, and the first main patterns SP1 may have various shapes, and are not limited to any particular shape.

The first adjacent patterns SP1H are located adjacent to the sensing transmission region TA2. One first adjacent pattern SP1H has a second area which is smaller than the first area of one first main pattern SP1. The first adjacent pattern SP1H may have a shape in which a region overlapping the sensing transmission region TA2 is removed from the same rhombic shape as that of the first main pattern SP1.

According to some embodiments, the first bridge pattern BP1 is connected to the first main pattern SP1. The first bridge pattern BP1 may be located between two adjacent first main patterns SP1 to connect the two first main patterns SP1. Alternatively, the first bridge pattern BP1 may be located between the first main pattern SP1 and the first adjacent pattern SP1H to connect the first main pattern SP1 and the first adjacent pattern SP1H.

The second sensing electrodes TE2 are arranged along the second direction DR2, and each thereof is extended along the first direction DR1. The second sensing electrodes TE2 may each include second main patterns SP2, second adjacent patterns SP2H, and second bridge patterns BP2.

The second main pattern SP2 are arranged to be spaced apart from the hole MH. The second main pattern SP2 may be spaced apart from the first main pattern SP1. The first main pattern SP1 and the second main pattern SP2 may not be in contact with each other, and thus, may transmit and receive independent electrical signals.

According to some embodiments, the second main pattern SP2 may have the same shape as that of the first main pattern SP1. For example, the second main pattern SP2 may have a rhombic shape. However, this is only illustrated as an example, and the second main pattern SP2 may have various shapes, and is not limited to any one embodiment.

The second adjacent pattern SP2H are located adjacent to the hole MH. The second adjacent pattern SP2H has an area smaller than the area of the second main pattern SP2. The second adjacent pattern SP2H may have a shape in which a region overlapping the hole MH is removed from the same rhombic shape as that of the second main pattern SP2.

According to some embodiments, the second bridge pattern BP2 is extended along the first direction DR1. The second bridge pattern BP2 is connected to the second main pattern SP2. The second bridge pattern BP2 may be located between two adjacent second main patterns SP2 to connect the two second main patterns SP2. Alternatively, the second bridge pattern BP2 may be located between the second main pattern SP2 and the second adjacent pattern SP2H to connect the second main pattern SP2 and the second adjacent pattern SP2H. The second bridge pattern BP2 may be provided in the shape of a single body with the second main patterns SP2. Therefore, the second main patterns SP2 and the second bridge patterns BP2 included in one second sensing electrode TE2 may be provided as one pattern.

The trace lines TL1, TL2, and TL3 are located in the second peripheral region NAA2. The trace lines TL1, TL2, and TL3 may include first trace lines TL1, second trace lines TL2, and third trace lines TL3.

The first trace lines TL1 are respectively connected to the first sensing electrodes TE1. According to some embodiments, the first trace lines TL1 are respectively connected to lower ends of both ends of the first sensing electrodes TE1.

The second trace lines TL2 are respectively connected to one ends of the second sensing electrodes TE2. According to some embodiments, the second trace lines TL2 are respectively connected to left ends of both ends of the second sensing electrodes TE2.

The third trace lines TL3 are respectively connected to upper ends of both ends of the first sensing electrodes TE1. According to the inventive concept, the first sensing electrodes TE1 may be respectively connected to the first trace lines TL1 and to the third trace lines TL3. Accordingly, sensitivity according to a region may be uniformly maintained with respect to the first sensing electrodes TE1 which are relatively long compared to the second sensing electrodes TE2. Meanwhile, this is only illustrated as an example, and in the input sensor 220 according to some embodiments of the inventive concept, the third trace lines TL3 may be omitted, and are not limited to any one embodiment.

The sensing pads T1, T2, and T3 are located in the second peripheral region NAA2. The sensing pads T1, T2, and T3 may include first sensing pads T1, second sensing pads T2, and third sensing pads T3. The first sensing pads T1 are respectively connected to the first trace lines TL1 to provide an external signal to the first sensing electrodes TE1. The second sensing pads T2 are respectively connected to the second trace lines TL2 to be electrically connected to the second sensing electrodes TE2, and the third sensing pads T3 are respectively connected to the third trace lines TL3 to be electrically connected to the first sensing electrodes TE1.

The input sensor 220 according to some embodiments of the present invention may further include a sensing circuit HCC. The sensing circuit HCC receives independent electrical signals from the first sensing electrodes TE1 and the second sensing electrodes TE2. The sensing circuit HCC may include a sensing pattern HCP and a sensing line HCL connected to the sensing pattern HCP. The sensing line HCL may include a connection line BRH, a first routing line HCL1 and a second routing line HCL2.

The sensing pattern HCP may be located in the sensing transmission region TA2. Accordingly, the sensing pattern HCP may overlap the signal transmission region TA of the electronic panel 200. The sensing pattern HCP is extended along the edge of the hole MH in the sensing transmission region TA2. According to some embodiments, the sensing pattern HCP surrounds at least a portion of the hole MH, and may have a closed loop shape to which a plurality of segments are connected. A detailed description will be followed.

The sensing line HCL is located in the second peripheral region NAA2. According to some embodiments, the sensing line HCL is illustrated as being located further outside than the first to third trace lines TL1, TL2, and TL3. However, the embodiments of the inventive concept are not limited thereto, and the sensing line HCL may be located more adjacent to the second active region AA2 than the first to third trace lines TL1, TL2, and TL3.

The sensing line HCL is electrically connected to the sensing pattern HCP. The sensing line HCL may include the first routing line HCL1 and the second routing line HCL2 which are arranged to be spaced apart from each other.

One end of the first routing line HCL1 is connected to a first pad H11, and one end of the second routing line HCL2 is connected to a second pad H12. The first pad H11 and the second pad H12 may be located on the left side with respect to a region in which the display pads DPD are located.

The other end of the first routing line HCL1 is connected to a third pad H21, and the other end of the second routing line HCL2 is connected to a fourth pad H22. The third pad H21 and the fourth pad H22 may be located on the right side with respect to the region in which the display pads DPD are located. The first pad H11 and the second pad H12 are arranged to be spaced apart from the third pad H21 and the fourth pad H22 with the display pads DPD interposed therebetween.

The connection line BRH includes a first connection line BRH1 and a second connection line BRH2. According to some embodiments, the first connection line BRH1 and the second connection line BRH2 may each be extended to the sensing transmission region TA2 across the second active region AA2 from the second peripheral region NAA2. The first connection line BRH1 connects the first routing line HCL1 and the sensing pattern HCP. The second connection line BRH2 connects the second routing line HCL2 and the sensing pattern HCP. The first sensing electrode TE1 may be electrically insulated from the second sensing electrode TE2. A detailed description thereof will be described later.

According to the inventive concept, through the sensing circuit HCC, it is possible to determine whether there is occurrence of damage such as cracks in the sensing transmission region TA2 or the second peripheral region NAA2. In the sensing circuit HCC, the first pad H11 and the third pad H21 may be input terminals, and the second pad H12 and the fourth pad H22 may be output terminals.

An electrical signal received through the first pad H11 may be introduced to one end of the sensing pattern HCP via the first routing line HCL1. Thereafter, an electrical signal output from the sensing pattern HCP is output to the second pad H12 via the second routing line HCL2.

In the same manner, an electrical signal received through the third pad H21 may be introduced to the one end of the sensing pattern HCP via the first routing line HCL1. Thereafter, an electrical signal output from the sensing pattern HCP is output to the fourth pad H22 via the second routing line HCL2.

The sensing circuit HCC according to some embodiments may determine whether or not there is occurrence of a crack in a region adjacent to the hole MH during a process of forming the hole MH in the electronic panel 200. For example, when signals respectively sensed in the second pad H12 and the fourth pad H22 are sensed as a defect such as a low level or zero (0) level value with respect to a reference signal, it is highly likely that both the first and second routing lines HCL1 and HCL2 are damaged or the sensing pattern HCP is damaged in the process of forming the hole MH on the electronic panel 200. Through the above, it is possible to determine whether there is a crack in the signal transmission region TA.

Alternatively, when only a signal sensed in any one of the second pad H12 and the fourth pad H22 is not sensed as a defect, it is highly likely that the sensing line HCL is damaged. Through the above, it is possible to determine whether there is a crack in the second peripheral region NAA2. However, this is only described as an example, and the first pad H11 and the third pad H21 may be output terminals and the second pad H12 and the fourth pad H22 may function as input terminals, but the embodiments of the inventive concept are not limited to any one embodiment.

According to some embodiments, because the input sensor 220 further includes the sensing circuit HCC, it is possible to easily detect whether there is a defect in the second peripheral region NAA2, and the sensing transmission region TA2 in which the hole MH is formed. Accordingly, the reliability of the electronic apparatus EA (see FIG. 1A) is improved, and it is possible to determine whether the electronic apparatus is defective without a separate inspection circuit or inspection device, so that process efficiency may be increased.

Referring to FIG. 3D, sensing electrode patterns included in the input sensor 220 include a plurality of first conductive lines LE1 extended in a first extension direction EDR1 and a plurality of second conductive lines LE2 extended in a second extension direction EDR2 crossing the first extension direction EDR1.

Because the first conductive lines LE1 and the second conductive lines LE2 are arranged along the first direction DR1 and the second direction DR2 at regular intervals, the sensing electrode patterns may have a mesh shape. The first conductive lines LE1 and the second conductive lines LE2 may be connected to each other to define an opening T-OP.

Through the opening T-OP, light generated in a light emitting element may be provided to the window 100 (see FIG. 1B).

In the inventive concept, the "sensing electrode patterns" may include the first main patterns SP1 and the first adjacent patterns SP1H included in the first sensing electrode TE1, and the second main patterns SP2, the second adjacent patterns SP2H, and the second bridge patterns BP2 included in the second sensing electrode TE2.

Each of the first sensing electrodes TE1 located in the second active region AA2 may include the first main patterns SP1 arranged in the second direction DR2 and the first bridge patterns BP1 located between the first main patterns SP1.

Each of the second sensing electrodes TE2 located in the second active region AA2 may include the second main patterns SP2 arranged in the first direction DR1 and the second bridge patterns BP2 located between the second main patterns SP2.

The first main patterns SP1, the second main patterns SP2, and the second bridge patterns BP2 may be located on the same layer, and the first bridge patterns BP1 may be located on a different layer from the patterns. According to some embodiments, because the "sensing electrode patterns" are defined as the first main patterns SP1 and the first adjacent patterns SP1H included in the first sensing electrode TE1, and the second main patterns SP2, the second adjacent patterns SP2H, and the second connection patterns BP2 included in the second sensing electrode TE2, the "sensing electrode patterns" may be located on the same layer and include the conductive lines LE1 and LE2.

The first bridge patterns BP1 may be connected to adjacent first main patterns SP1 through contact holes TNT defined in an insulation layer located between the first main patterns SP1 and the first bridge patterns BP1.

Figure 4A:
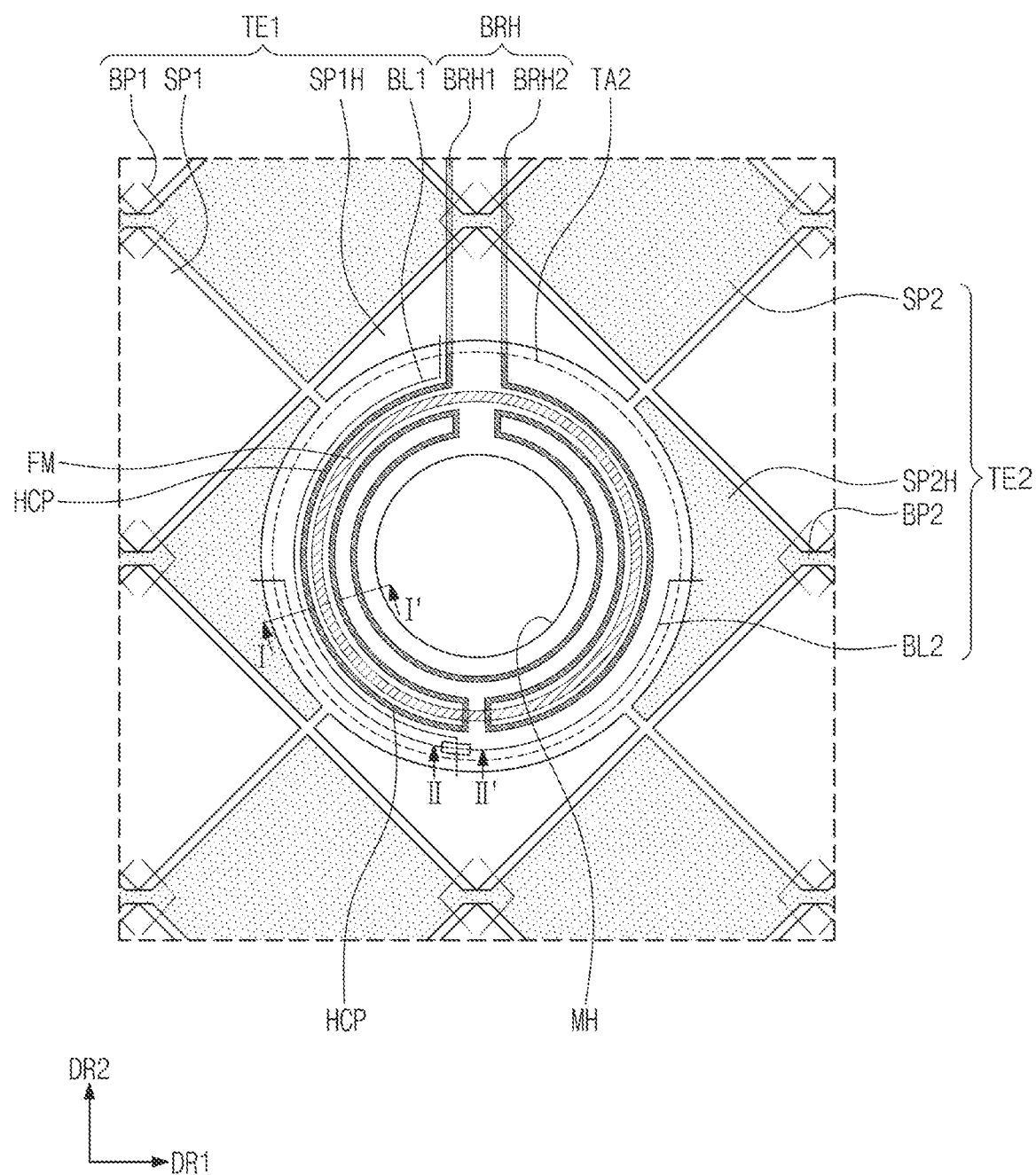
FIG. 4A is an enlarged view of an input sensor overlapping a signal transmission region according to some embodiments of the inventive concept.
Figure 4B:
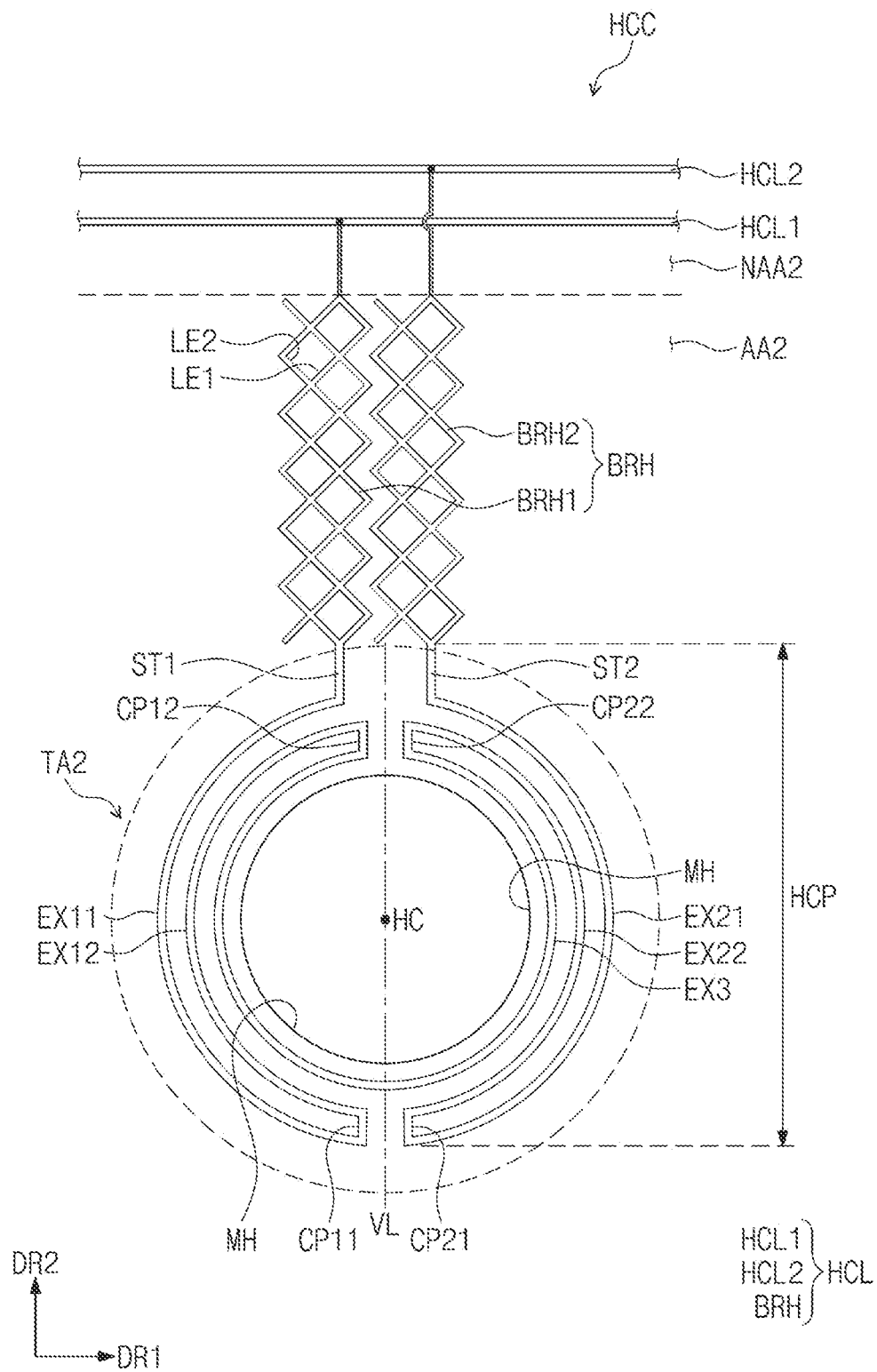
FIG. 4B is a plan view of a sensing circuit according to some embodiments of the inventive concept.
Figure 5A:
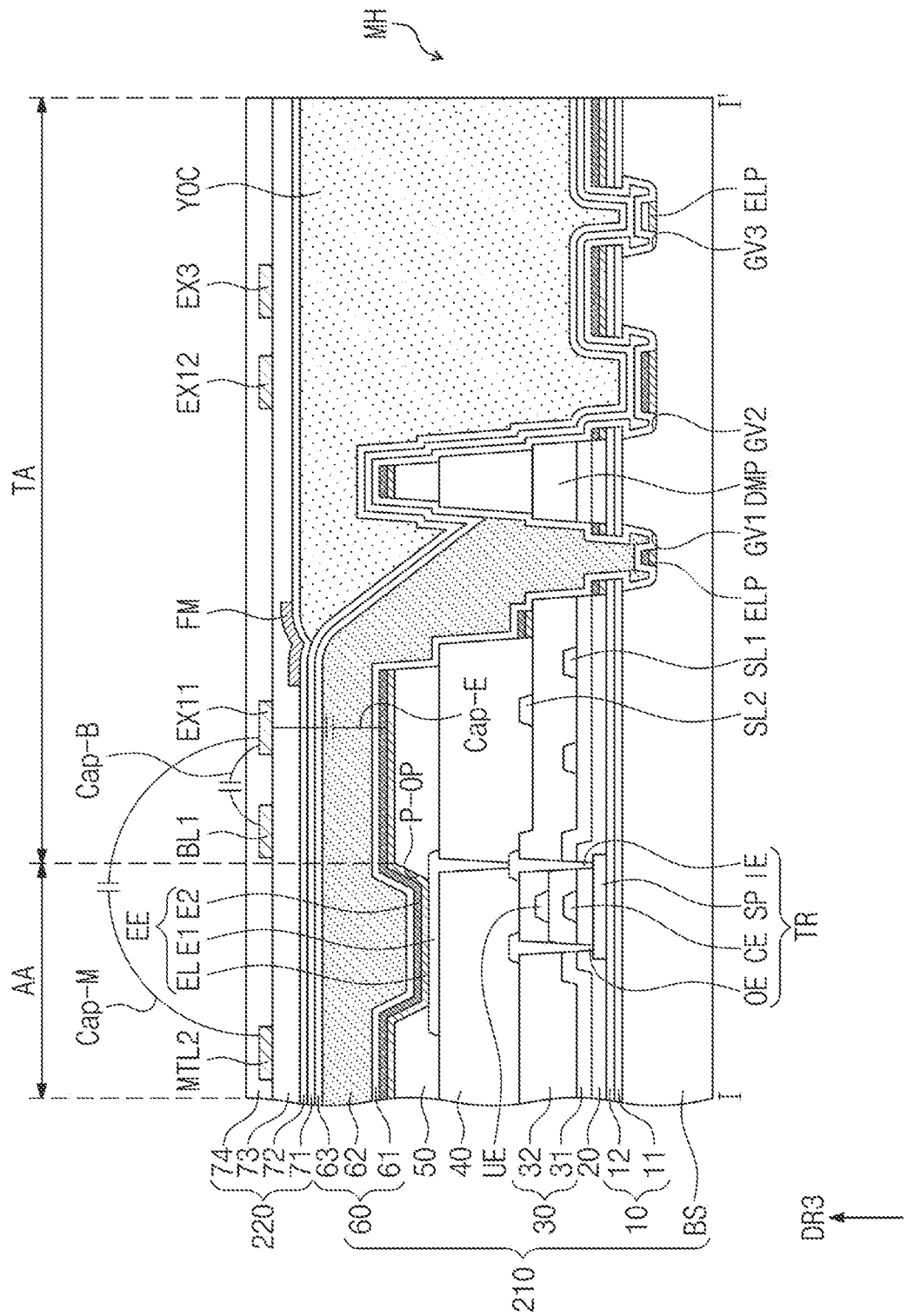
FIG. 5A is a cross-sectional view taken along the line I-I' of FIG. 4A.
Figure 5B:
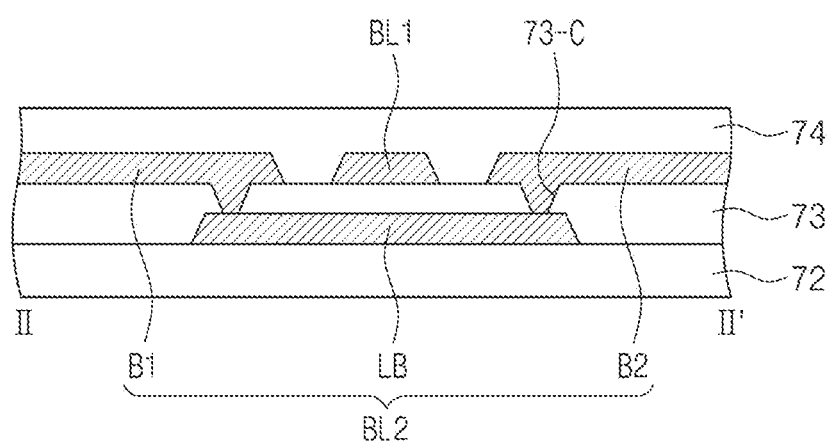
FIG. 5B is a cross-sectional view taken along the line II-II' of FIG. 4A.

FIG. 4A is an enlarged view of an input sensor overlapping a signal transmission region according to some embodiments of the inventive concept. FIG. 4B is a plan view of a sensing circuit according to some embodiments of the inventive concept. FIG. 5A is a cross-sectional view taken along line I-I' of FIG. 4A. FIG. 5B is a cross-sectional view taken along the line II-II' of FIG. 4A. Referring to FIG. 4A to FIG. 5B, the sensing circuit HCC according to some embodiments will be described in more detail.

Referring to FIG. 4A and FIG. 4B, the input sensor 220 according to the inventive concept may further include compensation lines BL1 and BL2 overlapping the sensing transmission region TA2. A first compensation line BL1 may connect between the first adjacent patterns SP1H spaced apart in the second direction DR2 with the hole MH interposed therebetween. One end of the first compensation line BL1 may be connected to a first adjacent pattern SP1H located on an upper side with respect to the hole MH, and the other end of the first compensation line BL1 may be connected to a first adjacent pattern SP1H located on a lower side with respect to the hole MH. According to some embodiments, the first compensation line BL1 may be extended in a semi-circular shape along the left side of the hole MH.

A second compensation line BL2 may connect between the second adjacent patterns SP2H spaced apart in the first direction DR1 with the hole MH interposed therebetween. One end of the second compensation line BL2 may be connected to a second adjacent pattern SP2H located on the left side with respect to the hole MH, and the other end of the second compensation line BL2 may be connected to a second adjacent pattern SP2H located on a right side with respect to the hole MH. According to some embodiments, the second compensation line BL2 may be extended in a semi-circular shape along the lower end of the hole MH.

The compensation lines BL1 and BL2 may connect between the adjacent patterns SP1H and SP2H disconnected during the process of forming the hole MH. Accordingly, even when the hole MH is formed in the second active region AA2, it is possible to compensate the sensing sensitivity of a region adjacent to the hole MH.

FIG. 4B illustrates an enlarged portion of the sensing circuit HCC. The sensing circuit HCC may include a sensing pattern HCP and a sensing line HCL connected to the sensing pattern HCP. The sensing line HCL may include a connection line BRH, a first routing line HCL1, and a second routing line HCL2. The descriptions about the first routing line HCL1 and the second routing line HCL2 may be the same as those described with respect to FIG. 3C.

The sensing pattern HCP according to some embodiments may include extension portions EX11, EX12, EX21, EX22, and EX3 and connection portions CP11, CP12, CP21, and CP22. The sensing pattern HCP may overlap the sensing transmission region TA2. According to some embodiments, the hole MH may have a circular shape.

A first extension portion EX11 may be located on the left side of the hole MH. The first extension portion EX11 may have a semi-circular shape corresponding to the left side of the hole MH. A second extension portion EX21 may have a semi-circular shape corresponding to the right side of the hole MH. The second extension portion EX21 may have a line-symmetrical shape with the first extension portion EX11 with respect to a virtual line VL crossing the center HC of the hole MH. A third extension portion EX12 may be located between the hole MH and the first extension portion EX11. The third extension portion EX12 may have a semi-circular shape corresponding to the first extension portion EX11. A fourth extension portion EX22 may be located between the hole MH and the second extension portion EX21. The fourth extension portion EX22 may have a semi-circular shape corresponding to the second extension portion EX21. The fourth extension portion EX22 may have a line-symmetrical shape with the third extension portion EX12 with respect to the virtual line VL.

A first connection portion CP11 may be connected to one end of the first extension portion EX11 and one end of the third extension portion EX12. A second connection portion CP21 may be connected to one end of the second extension portion EX21 and one end of the fourth extension portion EX22. The first connection portion CP11 and the second connection portion CP21 are extended in the second direction DR2, and may face each other in the first direction DR1. The first connection portion CP11 and the second connection portion CP21 may cross the floating pattern FM.

A fifth extension portion EX3 may be located among the hole MH, the third extension portion EX12, and the fourth extension portion EX22. The fifth extension portion EX3 may surround at least a portion of the hole MH. Among the extension portions EX11, EX12, EX21, EX22, and EX3, the fifth extension portion EX3 may be located most adjacent to the hole MH.

A third connection portion CP12 may be connected to the other end of the third extension portion EX12 and one end of the fifth extension portion EX3. A fourth connection portion CP22 may be connected to the other end of the fourth extension portion EX22 and the other end of the fifth extension portion EX3. The third connection portion CP12 and the fourth connection portion CP22 are extended in the second direction DR2, and may face each other in the first direction DR1.

According to some embodiments, the extension portions EX11, EX12, EX21, EX22, and EX3 and the connection portions CP11, CP12, CP21, and CP22 may be connected to each other to have a closed-loop shape.

The sensing pattern HCP according to some embodiments may further include a first protrusion portion ST1 and a second protrusion portion ST2. The first protrusion portion ST1 and the second protrusion portion ST2 may be located in the sensing transmission region TA2. To the other end of the first extension portion EX11, the first protrusion portion ST1 may be connected, and the first protrusion portion ST1 may be connected to the first connection line BRH1. To the other end of the second extension portion EX21, the second protrusion portion ST2 may be connected, and the second protrusion portion ST2 may be connected to the second connection line BRH2. However, the embodiments of the inventive concept are not limited thereto. The first protrusion portion ST1 and the second protrusion portion ST2 may be omitted, and are not limited to any one embodiment.

The connection line BRH includes a first connection line BRH1 and a second connection line BRH2. To one end of the first connection line BRH1, the first protrusion portion ST1 may be connected, and to the other end of the first connection line BRH1, the first routing line HCL1 (see FIG. 3C) may be connected. To one end of the second connection line BRH2, the second protrusion portion ST2 may be connected, and to the other end of the second connection line BRH2, the second routing line HCL2 (see FIG. 3C) may be connected.

According to some embodiments, in the first connection line BRH1 and the second connection line BRH2, a portion overlapping the second active region AA2 may include conductive lines LE1 and LE2 extended in directions crossing each other. The conductive lines LE1 and LE2 may have a shape corresponding to the sensing electrode patterns described with respect to FIG. 3D. According to some embodiments, even when the first connection line BRH1 and the second connection line BRH2 are extended to the second peripheral region NAA2 by crossing the second active region AA2 from the sensing transmission region TA2, the conductive lines LE1 and LE2 having a shape corresponding to the conductive lines LE1 and LE2 (see FIG. 3D) included in the sensing electrode patterns are included, so that it is possible to prevent the connection line BRH from being visually recognized by a user.

Referring to FIG. 5A, the electronic panel 200 (see FIG. 1B) may include the display unit 210 and the input sensor 220. The display unit 210 and the input sensor 220 may be laminated along the third direction DR3. The display unit 210 includes the base substrate BS, a pixel PX (see FIG. 3A), a plurality of insulation layers 10, 20, 30, and 50, and an encapsulation layer 60.

The base substrate BS may be an insulation substrate. For example, the base substrate BS may include a plastic substrate or glass substrate.

According to some embodiments, among the components of the equivalent circuit diagram of the pixel PX illustrated in FIG. 3A, a transistor TR corresponding to a driving transistor and a light emitting element EE are illustrated as an example. The insulation layers 10, 20, 30, 40, and 50 may include first to fifth insulation layers 10, 20, 40, and 50 which are sequentially laminated. Meanwhile, each of the first to fifth insulation layers 10, 20, 30, 40, and 50 may include an organic matter and/or an inorganic matter, and may have a single layer or a laminated structure.

The first insulation layer 10 is located on the base substrate BS to cover the front surface of the base substrate BS. The first insulation layer 10 may include a barrier layer 11 and/or a buffer layer 12. Accordingly, the first insulation layer 10 may prevent oxygen or moisture introduced through the base substrate BS from penetrating into a pixel PX, or may reduce the surface energy of the base substrate BS such that the pixel PX is stably formed on the base substrate BS.

However, this is only illustrated as an example. In the electronic panel 200 according to some embodiments of the inventive concept, at least one of the barrier layer 11 and the buffer layer 12 may be omitted, or the first insulation layer 10 may have a structure in which a plurality of layers are laminated, but is not limited to any one embodiment.

A transistor TR is located on the first insulation layer 10. The transistor TR includes a semiconductor pattern SP, a control electrode CE, an input electrode IE, and an output electrode OE. The semiconductor pattern SP is located on the first insulation layer 10. The semiconductor pattern SP may include a semiconductor material. The control electrode CE is spaced apart from the semiconductor pattern SP with the second insulation layer 20 interposed therebetween. The control electrode CE may be connected to a switching transistor and one electrode of a capacitor.

The input electrode IE and the output electrode OE are located on the third insulation layer 30 and are spaced apart from each other on a plane (e.g., in a plan view). The input electrode IE and the output electrode OE are respectively connected to one side and the other side of the semiconductor pattern SP by passing through the second insulation layer 20 and the third insulation layer 30.

Meanwhile, the display unit 210 according to some embodiments of the inventive concept may further include an upper electrode UE. According to some embodiments, the third insulation layer 30 is illustrated as including a lower layer 31 and an upper layer 32. However, this is only illustrated as an example, and the third insulation layer 30 according to some embodiments of the inventive concept may have a single-layered structure, and is not limited to any one embodiment.

The upper electrode UE is located between the lower layer 31 and the upper layer 32. The upper electrode UE may overlap the control electrode CE on a plane (e.g., in a plan view). According to some embodiments, the upper electrode UE may receive the same electrical signal as the control electrode CE, or may receive a different electrical signal from the control electrode CE to function as one electrode of a capacitor. Meanwhile, this is only illustrated as an example, and in the electronic panel 200 according to some embodiments of the inventive concept, the upper electrode UE may be omitted, and the embodiments of the inventive concept are not limited to any one embodiment.

The fourth insulation layer 40 is located on the third insulation layer 30 to cover the input electrode IE and the output electrode OE. Meanwhile, in the transistor TR, the semiconductor pattern SP may be located on the control electrode CE. Alternatively, the semiconductor pattern SP may be located on the input electrode IE and the output electrode OE. Alternatively, the input electrode IE and the output electrode OE may be located on the same layer with the semiconductor pattern SP and directly connected to the semiconductor pattern SP. The transistor TR according to some embodiments of the inventive concept may be formed in various configurations, and is not limited to any one embodiment.

The light emitting element EE is located on the fourth insulation layer 40. The light emitting element EE includes a first electrode E1, a light emitting layer EL, and a second electrode E2.

The first electrode E1 may be connected to the transistor TR by passing through the fourth insulation layer 40. Meanwhile, according to some embodiments, the electronic panel 200 may further include a separate connection electrode located between the first electrode E1 and the transistor TR, and at this time, the first electrode E1 may be electrically connected to the transistor TR through the connection electrode.

The fifth insulation layer 50 is located on the fourth insulation layer 40. The fifth insulation layer 50 may include an organic material and/or an inorganic material, and may have a single-layered or multi-layered structure. In the fifth insulation layer a display opening P-OP may be defined. The display opening P-OP exposes at least a portion of the first electrode E1. The fifth insulation layer 50 may be a pixel definition film.

The light emitting layer EL is located between the first electrode E1 and the second electrode E2. The light emitting layer EL may be composed of at least one material among materials emitting red, green, or blue light, and may include a fluorescent material or a phosphorescent material. The light emitting layer EL may include an organic light emitting material or an inorganic light emitting material. The light emitting layer EL may emit light in response to a potential difference between the first electrode E1 and the second electrode E2.

According to some embodiments, the light emitting layer EL is illustrated as a layer having a shape of a single body overlapping a plurality of display openings P-OP. However, this is only illustrated as an example. The light emitting layer EL may be provided as a plurality of patterns corresponding to each display opening P-OP, and is not limited to any one embodiment.

Meanwhile, the light emitting layer EL may further include a charge control layer. The charge control layer is configured to control the movement of charges, and thus, improves light emission efficiency and lifespan of the light emitting element EE. At this time, the light emitting layer EL may include at least one of a hole transport material, a hole injection material, an electron transport material, or an electron injection material.

The second electrode E2 is located on the light emitting layer EL. The second electrode E2 may oppose the first electrode E1. The second electrode E2 may have a shape of a single body extended from the active region AA to the peripheral region NAA. The second electrode E2 may be commonly provided to a plurality of pixels PX. Each of the light emitting elements EE located in each of the pixels PX receives a common power voltage (e.g., a second power signal described above) through the second electrode E2.

The second electrode E2 may include a transmissive conductive material or a transreflective conductive material. Accordingly, light generated in the light emitting layer EL may be easily emitted toward the third direction DR3 through the second electrode E2. However, this is only illustrated as an example. The light emitting element EE according to some embodiments of the inventive concept may be driven, according to the design thereof, by a rear surface light emitting method in which the first electrode E1 includes a transmissive or a transreflective material, or by a double-sided light emitting method in which light is emitted toward both front and rear surfaces, but the embodiments of the inventive concept are not limited to any one embodiment.

According to some embodiments, because the second electrode E2 is formed as a common pattern located in the active region AA and the signal transmission region TA, a cap may be formed between the sensing pattern HCP and the second electrode E2.

The encapsulation layer 60 is located on the light emitting element EE and encapsulates the light emitting element EE. Meanwhile, according to some embodiments, a capping layer which covers the second electrode E2 may further be located between the second electrode E2 and the encapsulation layer 60.

The encapsulation layer 60 may include a first inorganic layer 61, an organic layer 62, and a second inorganic layer 63 sequentially laminated along the third direction DR3. However, the embodiments of the inventive concept are not limited thereto, and the encapsulation layer 60 may further include a plurality of inorganic layers and a plurality of organic layers.

The first inorganic layer 61 may cover the second electrode E2. The first inorganic layer 61 may prevent external moisture or oxygen from penetrating into the light emitting element EE. For example, the first inorganic layer 61 may include a silicon nitride, a silicon oxide, or a compound thereof. The first inorganic layer 61 may be formed through a chemical vapor deposition process.

The organic layer 62 may be located on the first inorganic layer 61 and come into contact with the first inorganic layer 61. The organic layer 62 may provide a flat surface on the first inorganic layer 61. Curves formed on an upper surface of the first inorganic layer 61 or particles and the like present on the first inorganic layer 61 are covered by the organic layer 62, so that the surface state of the upper surface of the first inorganic layer 61 may be prevented from affecting components formed on the organic layer 62. In addition, the organic layer 62 may relieve stress between contacting layers. The organic layer 62 may include an organic material, and may be formed though a solution process such as spin coating, slit coating, and ink jet processes.

A dam portion DMP may define the boundary of the organic layer 62. The dam portion DMP may be formed as multiple layers including the same material as that of at least one of the insulation layers 10, 20, 30, 40, and 50. The dam portion DMP may overlap the signal transmission region TA. A circuit element layer may include at least one transistor included in each of the pixels PX and the dam portion DMP overlapping the signal transmission region TA and surrounding the hole MH, and on the base substrate BS. A display element layer may include the light emitting element EE included in each of the pixels PX and connected to the at least one transistor, and on the circuit element layer.

The second inorganic layer 63 is located on the organic layer 62 and covers the organic layer 62. The second inorganic layer 63 may be stably formed on a relatively flat surface than being located on the first inorganic layer 61. The second inorganic layer 63 encapsulates moisture and the like discharged from the organic layer 62 to prevent the moisture and the like to be introduced to the outside. The second inorganic layer 63 may include a silicon nitride, a silicon oxide, or a compound thereof. The second inorganic layer 63 may be formed through a chemical vapor deposition process.

According to some embodiments, in the display unit 210, recessed patterns GV1, GV2, and GV3 overlapping the signal transmission region TA may be defined. Each of the recessed patterns GV1, GV2, and GV3 is defined recessed from an upper surface of the base substrate BS. Each of the recessed patterns GV1, GV2, and GV3 may be formed by removing at least a portion of the base substrate BS. In each of the recessed patterns GV1, GV2, and GV3, a deposition pattern ELP formed in the recessed patterns GV1, GV2, and GV3 during a process of applying a material forming the light emitting layer EL may be formed. The recessed patterns GV1, GV2, and GV3 may be covered by at least one of the first inorganic layer 61 and the second inorganic layer 63.

For example, a first recessed pattern GV1 is arranged to be spaced apart from the hole MH with the dam portion DMP interposed therebetween, and may be covered by the first inorganic layer 61. The inside of the first recessed pattern GV1 covered by the first inorganic layer 61 may be filled by the organic layer 62.

Second and third recessed patterns GV2 and GV3 may be located between the dam portion DMP and the hole MH. The second and third recessed patterns GV2 and GV3 may be covered by the first inorganic layer 61 and the second inorganic layer 63.

The electronic panel 200 according to some embodiments may further include the recessed patterns GV1, GV2, and GV3, and thus, blocks the continuity between the deposition pattern ELP and the light emitting layer EL of the light emitting element EE. Accordingly, by blocking a penetration path of external moisture or oxygen, it is possible to prevent damage to elements located in the active region AA.

In addition, the deposition pattern ELP located in each of the recessed patterns GV1, GV2, and GV3 is covered by the first inorganic layer 61 or the second inorganic layer 63, so that it is possible to prevent the deposition pattern ELP from moving to another element and affecting the same during a manufacturing process of the electronic panel 200. Accordingly, the process reliability of the electronic panel 200 may be improved. Meanwhile, this is only illustrated as an example, and in the electronic panel 200 according to some embodiments of the inventive concept, the recessed patterns GV1, GV2, GV3 may be provided as a single body or omitted, and are not limited to any one embodiment.

The electronic panel 200 according to the inventive concept may further include an organic pattern YOC. The organic pattern YOC includes an organic matter. The organic pattern YOC may overlap the signal transmission region TA. The organic pattern YOC covers a non-flat surface defined in the signal transmission region TA by the dam portion DMP or the recessed patterns GV1, GV2, and GV3 and provides a flat surface to an upper portion. Accordingly, even in a region of the signal transmission region TA in which the organic layer 62 is not located, a flat surface may be stably provided.

Because the organic pattern YOC includes an organic matter, during a process of forming a flat surface in the signal transmission region TA, a step may be formed with the organic layer 62 of the encapsulation layer 60 including a different organic matter.

The electronic panel 200 according to the inventive concept may further include a floating pattern FM. The floating pattern FM may be extended along the boundary of the organic pattern YOC. The floating pattern FM may be located between a first sensing insulation layer 72 and a second sensing insulation layer 73. However, the embodiments of the inventive concept are not limited thereto, and the first sensing insulation layer 72 may be omitted, and the floating pattern FM may be arranged in contact with an edge of the organic pattern YOC.

A portion in which a step is formed along the boundary of the organic pattern YOC may have a problem of delamination, cracking, or the like because the coupling force of the organic pattern YOC is reduced. The problem may be determined as a defect in a step of detecting defects of the display unit 210, and a defect of the organic pattern YOC may be determined as a defect in a step of detecting defects of the input sensor 220 located on the organic pattern YOC. Accordingly, a process of determining whether an insulation layer including an organic matter among the insulation layers included in the display unit 210 is defective and a process of determining whether sensing sensitivity of the input sensor 220 is defective are required.

The input sensor 220 may include a plurality of conductive patterns and a plurality of insulation layers 71, 72, 73, and 74. The insulation layers 71, 72, 73, and 74 may be sequentially laminated along the third direction DR3.

The intermediate insulation layer 71 may be located on the second inorganic layer 63. The organic pattern YOC may be located on a portion or area of the intermediate insulation layer 71 corresponding to the signal transmission region TA. Therefore, a portion of the intermediate insulation layer 71 may come into contact with the organic pattern YOC, and the remaining portion thereof may come into contact with the first sensing insulation layer 72.

The first sensing insulation layer 72 covers the intermediate insulation layer 71 and the organic pattern YOC. According to some embodiments, the first sensing insulation layer 72 may cover an upper surface of the organic pattern YOC in the signal transmission region TA and may cover an upper surface of the intermediate insulation layer 71 in the active region AA. According to some embodiments, the first bridge patterns BP1 and the floating pattern FM described with reference to FIG. 3D are located on the first sensing insulation layer 72, and may be covered by a second sensing insulation layer 73.

The second sensing insulation layer 73 may be located on the first sensing insulation layer 72. The second sensing insulation layer 73 may cover a portion of the intermediate insulation layer 71 and the organic pattern YOC. A third sensing insulation layer 74 may have a shape of a single body overlapping the signal transmission region TA and the active region AA.

In the present disclosure, sensing electrode patterns are located on the second sensing insulation layer 73, and may be covered by the third sensing insulation layer 74. FIG. 5A illustrates an example of one conductive pattern MTL2 among the sensing electrode patterns. In addition, the compensation lines BL1 and BL2 and the sensing pattern HCP of the sensing circuit HCC described with reference to FIG. 4A may be located on the second sensing insulation layer 73.

According to some embodiments, on a plane (e.g., in a plan view), a portion of the sensing pattern HCP may be located between the floating pattern FM and the sensing electrode patterns or between the floating pattern FM and the compensation lines BL1 and BL2 and overlap the organic layer 62 in the plan view, and the other portion of the sensing pattern HCP may be located between the floating pattern FM and the hole MH and be spaced apart from the organic layer 62 in the plan view.

For example, the first extension portion EX11 and the second extension portion EX21 of the extension portions EX11, EX12, EX21, EX22, and EX3 of the sensing pattern HCP described with reference to FIG. 4B are located at the outermost periphery of the sensing pattern HCP, and thus, may be located relatively adjacent to the sensing electrode patterns and the compensation lines BL1 and BL2. As an example, FIG. 5A illustrates that the first extension portion EX11 is more adjacent to the first compensation line BL1 than the third extension portion EX12 and the fifth extension portion EX3.

According to some embodiments, in a plan view, the first extension portion EX11 and the second extension portion EX21 may be arranged to be spaced apart from the hole MH with the floating pattern FM interposed therebetween, and the rest of the extension portions EX12, EX22, and EX3 may be located between the floating pattern FM and the hole MH.

Using the sensing circuit HCC according to the inventive concept, it is possible to perform a process of determining whether there is a crack in the signal transmission region TA, and using the sensing circuit HCC, it is possible to perform a process of determining whether an insulation layer including an organic matter among the insulation layers included in the display unit 210 is defective and a process of determining whether sensing sensitivity of the input sensor 220 is defective.

The process of determining whether there is a crack in the signal transmission region TA may be easily performed through the extension portions EX12, EX22, and EX3 adjacent to the hole MH in the sensing pattern HCP.

The process of determining whether an insulation layer including an organic matter is defective and a process of determining whether sensing electrode patterns are defective may be easily performed through the first extension portion EX11 and the second extension portion EX21 adjacent to the compensation lines BL1 and BL2 or the sensing electrode patterns.

For example, an electrical signal received through the first pad H11 (see FIG. 3C) may be introduced to one end of the sensing pattern HCP via the first routing line HCL1 (see FIG. 3C). Thereafter, an electrical signal output from the sensing pattern HCP is output to the second pad H12 (see FIG. 3C) via the second routing line HCL2 (see FIG. 3C).

In the same manner, an electrical signal received through the third pad H21 (see FIG. 3C) may be introduced to the one end of the sensing pattern HCP via the first routing line HCL1. Thereafter, an electrical signal output from the sensing pattern HCP is output to the fourth pad H22 (see FIG. 3C) via the second routing line HCL2.

At this time, between the first extension portion EX11 and the first compensation line BL1 adjacent to the first extension portion EX11, a first cap Cap-B may be formed. In addition, between the first extension portion EX11 and conductive patterns MTL2 adjacent to the first extension portion EX11, a second cap Cap-M may be formed. When the measurement result of the first cap Cap-B or the second cap Cap-M is an outlier value which is out of a set range, the insulation layer including an organic matter may be determined to be defective, or the sensing electrode patterns may be determined to be defective. The sensing circuit HCC according to some embodiments detects an amount of change in capacitance between horizontally arranged conductive patterns, and thus, may determine whether there is a defect in a mutual cap manner.

In addition, a third cap Cap-E may be formed between the second electrode E2 and the sensing pattern HCP which are formed as a single pattern in the active region AA. When the measurement result of the third cap Cap-E is an outlier value which is out of a set range, the insulation layer including an organic matter may be determined to be defective, or the sensing electrode patterns may be determined to be defective. The sensing circuit HCC according to some embodiments detects an amount of change in capacitance between vertically arranged conductive patterns, and thus, may determine whether there is a defect in a self cap manner.

According to the inventive concept, through the sensing circuit HCC included in the input sensor 220, it is possible to easily determine whether there is a crack or the like in the electronic panel 200 generated when forming the hole MH. In addition, using the sensing circuit HCC, the present invention may easily determine whether sensing electrode patterns included in the input sensor 220 are defective and whether an insulation layer including an organic matter is defective. Accordingly, it is possible to simplify a process of inspecting whether the electronic apparatus EA is defective.

As illustrated in FIG. 4A, the compensation lines BL1 and BL2 are located on the same layer, so that there may be a point where the compensation lines BL1 and BL2 cross each other. Referring to FIG. 5B, a point where the second compensation line BL2 crosses the first compensation line BL1 is illustrated as an example.

The second compensation line BL2 may include a first line B1, a second line B2, and a compensation bridge pattern LB. The first line B1 may be located on one side of the first compensation line BL1, and the second line B2 may be located on the other side of the first compensation line BL1.

According to some embodiments, the first line B1, the second line B2, and the first compensation line BL1 may be located on the second sensing insulation layer 73, and the compensation bridge pattern LB may be located on the first sensing insulation layer 72. The first line B1 and the second line B2 may be connected to the compensation bridge pattern LB through a contact hole 73-C defined in the second sensing insulation layer 73. Accordingly, even when the compensation lines BL1 and BL2 are located on the same layer, the adjacent patterns SP1H and SP2H (see FIG. 3C) spaced apart with the hole MH interposed therebetween may be easily connected.

The connection relationship at the crossing point of the compensation lines BL1 and BL2 described with reference to FIG. 5B may be equally applied to the connection relationship at a crossing point of compensation lines to be described later, and redundant descriptions will be omitted.

Figure 6:
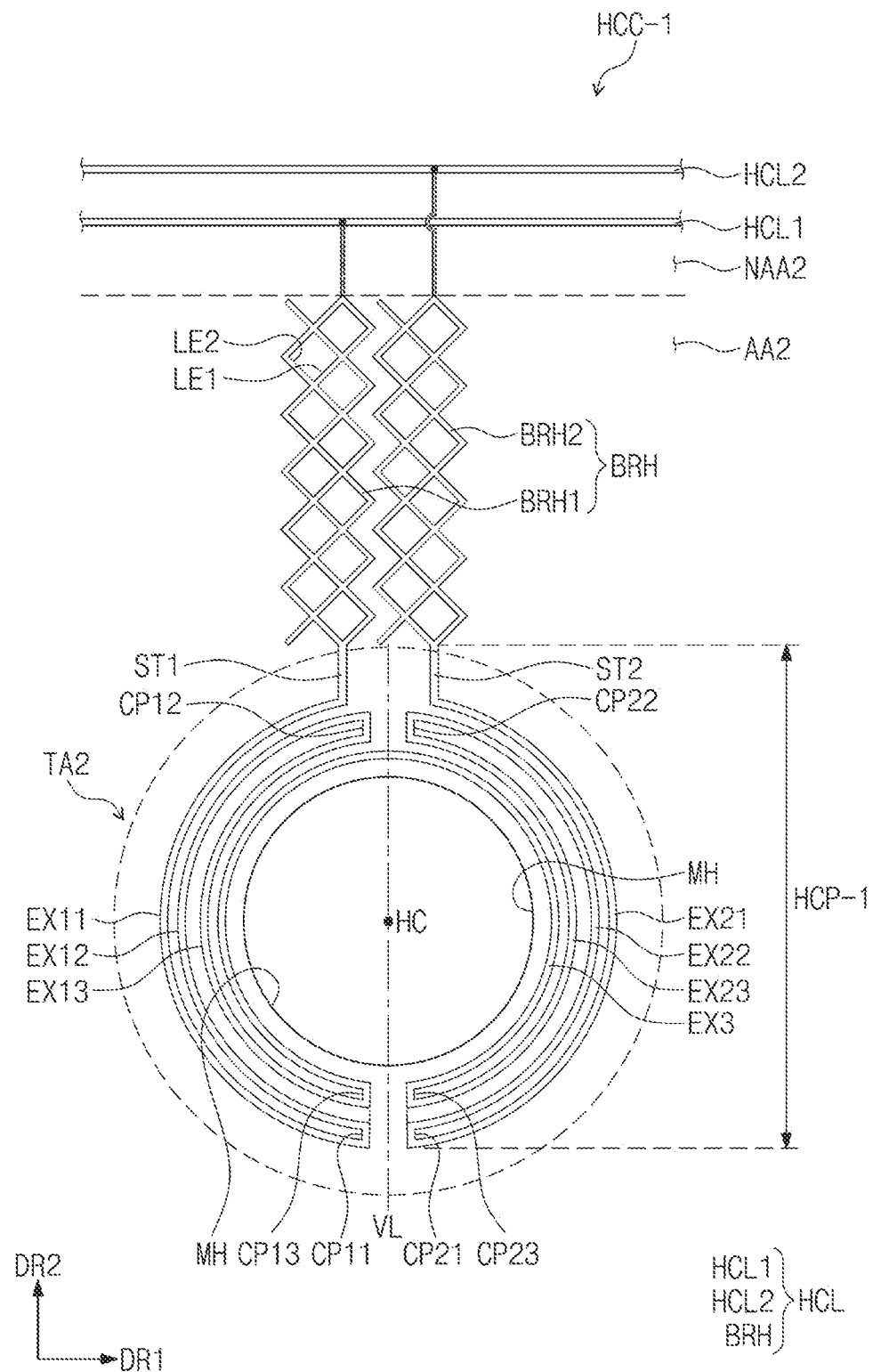
FIG. 6 is a plane view of a sensing circuit according to some embodiments of the inventive concept.

FIG. 6 is a plan view of a sensing circuit according to some embodiments of the inventive concept. The same/similar reference numerals are used for the same/similar components as those described with reference to FIG. 4A and FIG. 4B, and redundant descriptions will be omitted.

Referring to FIG. 6, a sensing circuit HCC-1 according to some embodiments may include a sensing pattern HCP-1 and a sensing line HCL connected to the sensing pattern HCP-1. The sensing line HCL may include a connection line BRH, a first routing line HCL1, and a second routing line HCL2. Descriptions about the first routing line HCL1, the second routing line HCL2, the first protrusion portion ST1, and the second protrusion portion ST2 may be the same as those described with reference to FIG. 3C and FIG. 4B.

The sensing pattern HCP-1 according to some embodiments may include extension portions EX11, EX12, EX13, EX21, EX22, EX23, and EX3 and connection portions CP11, CP12, CP13, CP21, CP22, and CP23. The sensing pattern HCP-1 may overlap the sensing transmission region TA2. According to some embodiments, the hole MH may have a circular shape.

A first extension portion EX11 may be located on the left side of the hole MH. The first extension portion EX11 may have a semi-circular shape corresponding to the left side of the hole MH. A second extension portion EX21 may have a semi-circular shape corresponding to the right side of the hole MH. The second extension portion EX21 may have a line-symmetrical shape with the first extension portion EX11 with respect to a virtual line VL crossing the center HC of the hole MH.

A third extension portion EX12 may be located between the hole MH and the first extension portion EX11. The third extension portion EX12 may have a semi-circular shape corresponding to the first extension portion EX11. A fourth extension portion EX22 may be located between the hole MH and the second extension portion EX21. The fourth extension portion EX22 may have a semi-circular shape corresponding to the second extension portion EX21. The fourth extension portion EX22 may have a line-symmetrical shape with the third extension portion EX12 with respect to the virtual line VL.

A first connection portion CP11 may be connected to one end of the first extension portion EX11 and one end of the third extension portion EX12. A second connection portion CP21 may be connected to one end of the second extension portion EX21 and one end of the fourth extension portion EX22. The first connection portion CP11 and the second connection portion CP21 are extended in the second direction DR2, and may face each other in the first direction DR1.

A fifth extension portion EX13 may be located between the hole MH and the third extension portion EX12. The fifth extension portion EX13 may have a semi-circular shape corresponding to the third extension portion EX12. A sixth extension portion EX23 may be located between the hole MH and the fourth extension portion EX22. The sixth extension portion EX23 may have a semi-circular shape corresponding to the fourth extension portion EX22. The sixth extension portion EX23 may have a line-symmetrical shape with the fifth extension portion EX13 with respect to the virtual line VL.

A third connection portion CP12 may be connected to the other end of the third extension portion EX12 and the other end of the fifth extension portion EX13. A fourth connection portion CP22 may be connected to the other end of the fourth extension portion EX22 and the other end of the sixth extension portion EX23. The third connection portion CP12 and the fourth connection portion CP22 are extended in the second direction DR2, and may face each other in the first direction DR1.

A seventh extension portion EX3 may be arranged among the hole MH, the fifth extension portion EX13, and the sixth extension portion EX23. The seventh extension portion EX3 may surround at least a portion of the hole MH. Among the extension portions EX11, EX12, EX13, EX21, EX22, EX23, and EX3, the seventh extension portion EX3 may be located most adjacent to the hole MH.

A fifth connection portion CP13 may be connected to one end of the fifth extension portion EX13 and one end of the seventh extension portion EX3. A sixth connection portion CP23 may be connected to the one end of the sixth extension portion EX23 and the other end of the seventh extension portion EX3. The fifth connection portion CP13 and the sixth connection portion CP23 are extended in the second direction DR2, and may face each other in the first direction DR1.

According to some embodiments, the extension portions EX11, EX12, EX13, EX21, EX22, EX23, and EX3 and the connection portions CP11, CP12, CP13, CP21, CP22, and CP23 may be connected to each other to have a closed-loop shape. However, the sensing pattern HCP-1 according to some embodiments is not limited thereto, and any one of the extension portions EX11, EX12, EX13, EX21, EX22, EX23, and EX3 and the connection portions CP11, CP12, CP13, CP21, CP22, and CP23 may be omitted, or additional extension portions and additional connection portions may be further included, but the embodiments of the inventive concept are not limited to any one embodiment.

Figure 7:
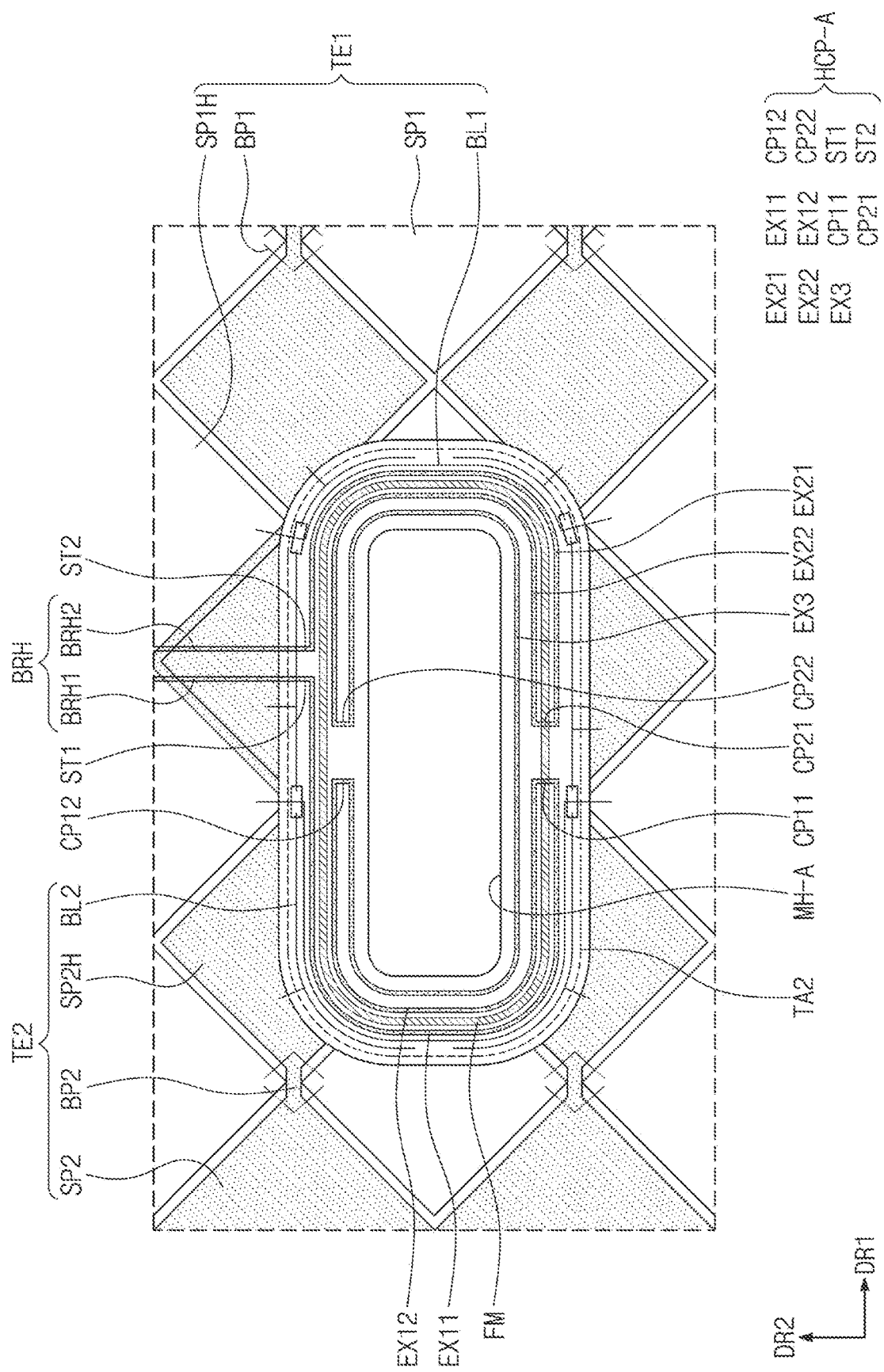
FIG. 7 is an enlarged view of an input sensor overlapping a signal transmission region according to some embodiments of the inventive concept.
Figure 8:
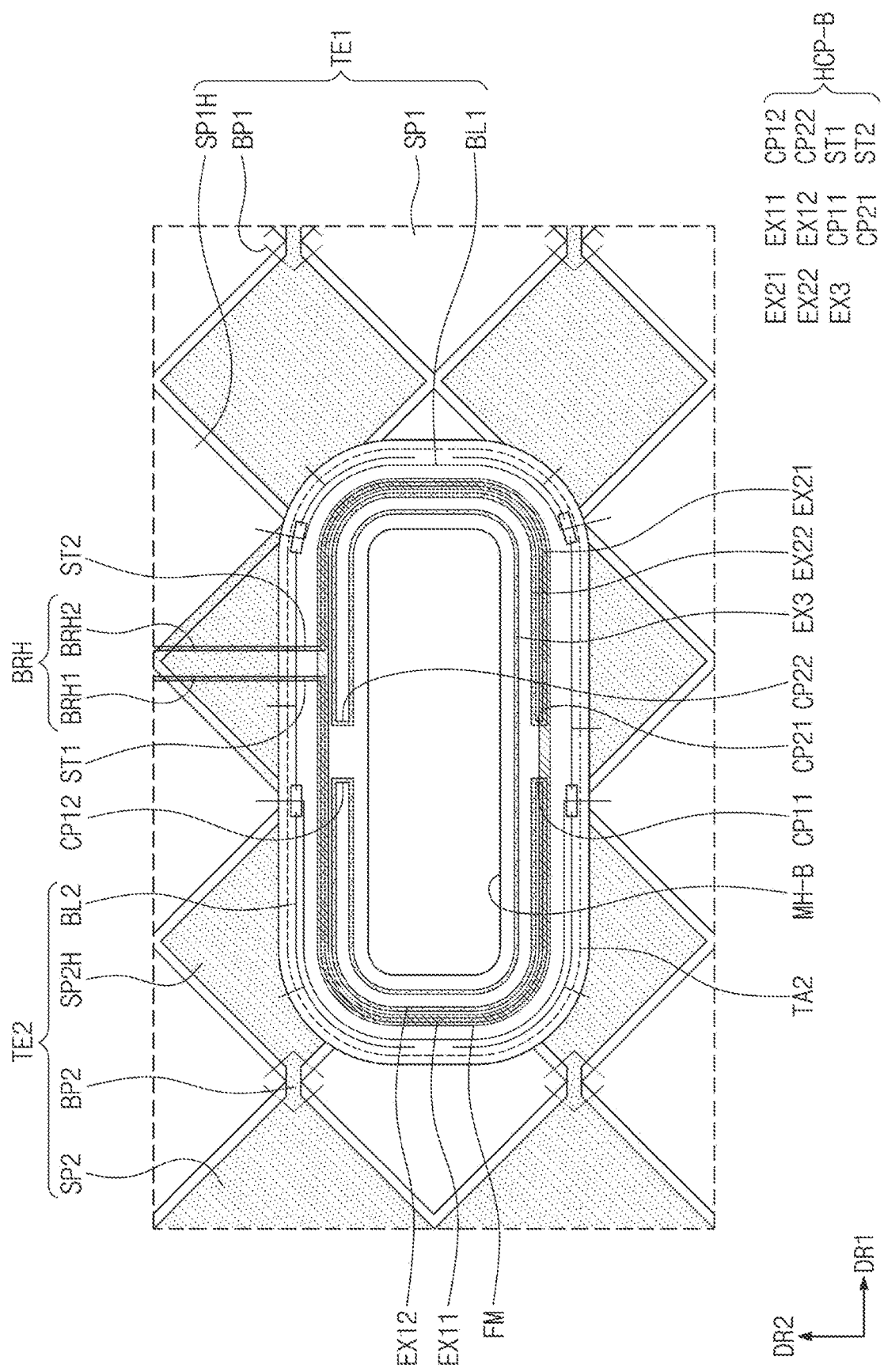
FIG. 8 is an enlarged view of an input sensor overlapping a signal transmission region according to some embodiments of the inventive concept.
Figure 9:
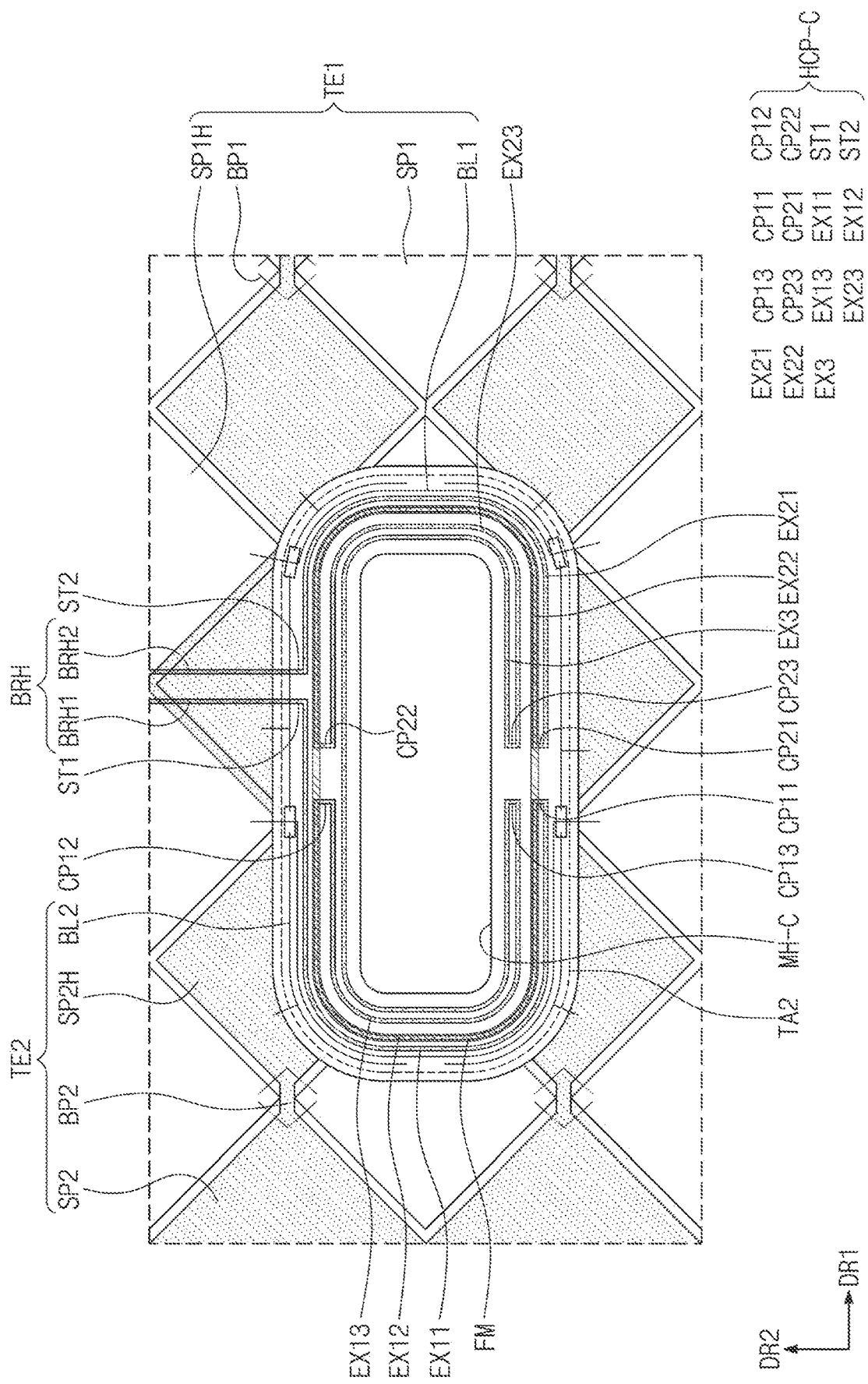
FIG. 9 is an enlarged view of an input sensor overlapping a signal transmission region according to some embodiments of the inventive concept.

FIG. 7 is an enlarged view of an input sensor overlapping a signal transmission region according to some embodiments of the inventive concept. FIG. 8 is an enlarged view of an input sensor overlapping a signal transmission region according to some embodiments of the inventive concept. FIG. 9 is an enlarged view of an input sensor overlapping a signal transmission region according to some embodiments of the inventive concept. The same/similar reference numerals are given to the same/similar components as those described with reference to FIG. 3C to FIG. and redundant descriptions thereof will be omitted.

Referring to FIG. 7, the input sensor 220 (see FIG. 2) according to some embodiments may include a plurality of first sensing electrodes TE1 and a plurality of second sensing electrodes TE2. In the input sensor 220 according to some embodiments, a hole MH-A formed by passing through the input sensor 220 may be defined. The hole MH-A according to some embodiments may have a rectangular shape extended in the first direction DR1. Each corner of the hole MH-A may have a round shape.

The first sensing electrodes TE1 are arranged along the first direction DR1, and each thereof is extended along the second direction DR2. The first sensing electrodes TE1 may each include a first main pattern SP1, first adjacent patterns SP1H, a first bridge pattern BP1, and a first compensation line BL1.

The first main patterns SP1 are arranged to be spaced apart from the hole MH-A. The first main patterns SP1 have a shape (e.g., a set or predetermined shape), and may have an area larger than that of the first adjacent patterns SP1H. The first adjacent patterns SP1H may be formed by removing some of patterns having the same area as that of the first main patterns SP1 when forming the hole MH-A.

The first compensation line BL1 may be connected to the first adjacent patterns SP1H spaced apart in the second direction DR2 with the hole MH-A interposed therebetween among patterns included in the first sensing electrode TE1.

The second sensing electrodes TE2 are arranged along the second direction DR2, and each thereof is extended along the first direction DR1. The second sensing electrodes TE2 may each include a second main pattern SP2, second adjacent patterns SP2H, a second bridge pattern BP2, and a second compensation line BL2. The second main patterns SP2 are arranged to be spaced apart from the hole MH-A. The second main patterns SP2 have a shape (e.g., a set or predetermined shape), and may have an area larger than that of the second adjacent patterns SP2H. The second adjacent patterns SP2H may be formed by removing some of patterns having the same area as that of the second main patterns SP2 when forming the hole MH-A.

The second compensation line BL2 may be connected to the second adjacent patterns SP2H spaced apart in the first direction DR1 with the hole MH-A interposed therebetween among patterns included in the second sensing electrode TE2.

The sensing circuit HCC (see FIG. 3C) according to some embodiments may include a sensing pattern HCP-A and a sensing line HCL (see FIG. 3C) connected to the sensing pattern HCP-A. FIG. 7 only illustrates the connection line BRH in the sensing line HCL (see FIG. 3C), and the first routing line HCL1 (see FIG. 3C) and the second routing line HCL2 (see FIG. 3C) are omitted.

The sensing pattern HCP-A according to some embodiments may overlap the sensing transmission region TA2.

The sensing pattern HCP-A may include extension portions EX11, EX12, EX21, EX22, and EX3, connection portions CP11, CP12, CP21, and CP22, and protrusion portions ST1 and ST2.

A first extension portion EX11 may be located on the left side of the hole MH-A. The first extension portion EX11 may have a shape corresponding to the left side of the hole MH-A. A second extension portion EX21 may be located on the right side of the hole MH-A. The second extension portion EX21 may have a shape corresponding to the right side of the hole MH-A.

A third extension portion EX12 may be located between the hole MH-A and the first extension portion EX11. The third extension portion EX12 may have a shape corresponding to the first extension portion EX11. A fourth extension portion EX22 may be located between the hole MH-A and the second extension portion EX21. The fourth extension portion EX22 may have a shape corresponding to the second extension portion EX21.

A first connection portion CP11 may be connected to one end of the first extension portion EX11 and one end of the third extension portion EX12. A second connection portion CP21 may be connected to one end of the second extension portion EX21 and one end of the fourth extension portion EX22. The first connection portion CP11 and the second connection portion CP21 are extended in the second direction DR2, and may face each other in the first direction DR1.

To the other end of the first extension portion EX11, the first protrusion portion ST1 may be connected, and the first protrusion portion ST1 may be connected to the first connection line BRH1. To the other end of the second extension portion EX21, the second protrusion portion ST2 may be connected, and the second protrusion portion ST2 may be connected to the second connection line BRH2.

A fifth extension portion EX3 may be located among the hole MH-A, the third extension portion EX12, and the fourth extension portion EX22. The fifth extension portion EX3 may surround at least a portion of the hole MH-A. Among the extension portions EX11, EX12, EX21, EX22, and EX3, the fifth extension portion EX3 may be located most adjacent to the hole MH-A.

A third connection portion CP12 may be connected to the other end of the third extension portion EX12 and one end of the fifth extension portion EX3. A fourth connection portion CP22 may be connected to the other end of the fourth extension portion EX22 and the other end of the fifth extension portion EX3. The third connection portion CP12 and the fourth connection portion CP22 are extended in the second direction DR2, and may face each other in the first direction DR1.

According to some embodiments, the extension portions EX11, EX12, EX21, EX22, and EX3 and the connection portions CP11, CP12, CP21, and CP22 may be connected to each other to have a closed-loop shape.

The connection line BRH includes a first connection line BRH1 and a second connection line BRH2. To one end of the first connection line BRH1, the first protrusion portion ST1 may be connected, and to the other end of the first connection line BRH1, the first routing line HCL1 (see FIG. 3C) may be connected. To one end of the second connection line BRH2, the second protrusion portion ST2 may be connected, and to the other end of the second connection line BRH2, the second routing line HCL2 (see FIG. 3C) may be connected.

According to some embodiments, on a plane (e.g., in a plan view), a portion of the sensing pattern HCP-A may be located between the floating pattern FM and the sensing electrode patterns or between the floating pattern FM and the compensation lines BL1 and BL2, and the other portion of the sensing pattern HCP-A may be located between the floating pattern FM and the hole MH-A.

For example, the first extension portion EX11 and the second extension portion EX21 among the extension portions EX11, EX12, EX21, EX22, and EX3 of the sensing pattern HCP-A may be located at the outermost periphery of the sensing pattern HCP-A, and thus, are arranged to be spaced apart from the hole MH-A with the floating pattern FM interposed therebetween, and the rest of the extension portions EX12, EX22, and EX3 may be located between the floating pattern FM and the hole MH-A.

A process of determining whether there is a crack may be easily performed through the extension portions EX12, EX22, and EX3 located adjacent to the hole MH-A among the extension portions EX11, EX12, EX21, EX22, and EX3, and a process of determining whether an insulation layer including an organic matter is defective and a process of determining whether sensing electrode patterns are defective may be easily performed through the first extension portion EX11 and the second extension portion EX21 adjacent to the compensation lines BL1 and BL2 or the sensing electrode patterns.

Referring to FIG. 8, the input sensor 220 (see FIG. 2) according to some embodiments may include a plurality of first sensing electrodes TE1 and a plurality of second sensing electrodes TE2. In the input sensor 220 according to some embodiments, a hole MH-B formed by passing through the input sensor 220 may be defined. The hole MH-B according to some embodiments may have a rectangular shape extended in the first direction DR1. Each corner of the hole MH-B may have a round shape.

The first sensing electrodes TE1 are arranged along the first direction DR1, and each thereof is extended along the second direction DR2. The first sensing electrodes TE1 may each include a first main pattern SP1, first adjacent patterns SP1H, a first bridge pattern BP1, and a first compensation line BL1.

The first main patterns SP1 are arranged to be spaced apart from the hole MH-B. The first main patterns SP1 have a shape (e.g., a set or predetermined shape), and may have an area larger than that of the first adjacent patterns SP1H. The first adjacent patterns SP1H may be formed by removing some of patterns having the same area as that of the first main patterns SP1 when forming the hole MH-B.

The first compensation line BL1 may be connected to the first adjacent patterns SP1H spaced apart in the second direction DR2 with the hole MH-B interposed therebetween among patterns included in the first sensing electrode TE1.

The second sensing electrodes TE2 are arranged along the second direction DR2, and each thereof is extended along the first direction DR1. The second sensing electrodes TE2 may each include a second main pattern SP2, second adjacent patterns SP2H, a second bridge pattern BP2, and a second compensation line BL2.

The second main patterns SP2 are arranged to be spaced apart from the hole MH-B. The second main patterns SP2 have a shape (e.g., a set or predetermined shape), and may have an area larger than that of the second adjacent patterns SP2H. The second adjacent patterns SP2H may be formed by removing some of patterns having the same area as that of the second main patterns SP2 when forming the hole MH-B.

The second compensation line BL2 may be connected to the second adjacent patterns SP2H spaced apart in the first direction DR1 with the hole MH-B interposed therebetween among patterns included in the second sensing electrode TE2.

The sensing circuit HCC (see FIG. 3C) according to some embodiments may include a sensing pattern HCP-B and a sensing line HCL (see FIG. 3C) connected to the sensing pattern HCP-B. FIG. 8 only illustrates the connection line BRH in the sensing line HCL (see FIG. 3C), and the first routing line HCL1 (see FIG. 3C) and the second routing line HCL2 (see FIG. 3C) are omitted.

The sensing pattern HCP-B according to some embodiments may overlap the sensing transmission region TA2. The sensing pattern HCP-B may include extension portions EX11, EX12, EX21, EX22, and EX3, connection portions CP11, CP12, CP21, and CP22, and protrusion portions ST1 and ST2. Patterns included in the sensing pattern HCP-B may correspond to the patterns included in the sensing pattern HCP-A described with reference to FIG. 7, and differences therebetween will be mainly described.

According to some embodiments, in a plan view, a portion of the sensing pattern HCP-B may be arranged to overlap the floating pattern FM, and the other portion of the sensing pattern HCP-B may be located between the floating pattern FM and the hole MH-B.

For example, the first extension portion EX11 and the second extension portion EX21 of the extension portions EX11, EX12, EX21, EX22, and EX3 of the sensing pattern HCP-B are located at the outermost periphery of the sensing pattern HCP-B, and thus, may overlap the floating pattern FM on a plane (e.g., in a plan view). The rest of the extension portions EX12, EX22, and EX3 may be located between the floating pattern FM and the hole MH-B.

According to some embodiments, because the first extension portion EX11 and the second extension portion EX21 overlap the floating pattern FM, it is possible to secure a space in which the compensation lines BL1 and BL2 can be located in a region adjacent to the hole MH-B.

FIG. 9 will be described focusing on differences with FIG. 7 and FIG. 8.

A sensing pattern HCP-C according to some embodiments may include extension portions EX11, EX12, EX13, EX21, EX22, EX23, and EX3 and connection portions CP11, CP12, CP13, CP21, CP22, and CP23. A hole MH-C according to some embodiments may have a rectangular shape extended in the first direction DR1. Each corner of the hole MH-C may have a round shape.

A first extension portion EX11 may be located on the left side of the hole MH-C. The first extension portion EX11 may have a shape corresponding to the left side of the hole MH-C. A second extension portion EX21 may be located on the right side of the hole MH-C. The second extension portion EX21 may have a shape corresponding to the right side of the hole MH-C.

A third extension portion EX12 may be located between the hole MH-C and the first extension portion EX11. The third extension portion EX12 may have a shape corresponding to the first extension portion EX11. A fourth extension portion EX22 may be located between the hole MH-C and the second extension portion EX21. The fourth extension portion EX22 may have a shape corresponding to the second extension portion EX21.

A first connection portion CP11 may be connected to one end of the first extension portion EX11 and one end of the third extension portion EX12. A second connection portion CP21 may be connected to one end of the second extension portion EX21 and one end of the fourth extension portion EX22. The first connection portion CP11 and the second connection portion CP21 are extended in the second direction DR2, and may face each other in the first direction DR1.

A fifth extension portion EX13 may be located between the hole MH-C and the third extension portion EX12. The fifth extension portion EX13 may have a shape corresponding to the third extension portion EX12. A sixth extension portion EX23 may be located between the hole MH-C and the fourth extension portion EX22. The sixth extension portion EX23 may have a shape corresponding to the fourth extension portion EX22.

A third connection portion CP12 may be connected to the other end of the third extension portion EX12 and the other end of the fifth extension portion EX13. A fourth connection portion CP22 may be connected to the other end of the fourth extension portion EX22 and the other end of the sixth extension portion EX23. The third connection portion CP12 and the fourth connection portion CP22 are extended in the second direction DR2, and may face each other in the first direction DR1.

A seventh extension portion EX3 may be located among the hole MH-C, the fifth extension portion EX13, and the sixth extension portion EX23. The seventh extension portion EX3 may surround at least a portion of the hole MH-C. Among the extension portions EX11, EX12, EX13, EX21, EX22, EX23, and EX3, the seventh extension portion EX3 may be located most adjacent to the hole MH-C.

A fifth connection portion CP13 may be connected to one end of the fifth extension portion EX13 and one end of the seventh extension portion EX3. A sixth connection portion CP23 may be connected to the one end of the sixth extension portion EX23 and the other end of the seventh extension portion EX3. The fifth connection portion CP13 and the sixth connection portion CP23 are extended in the second direction DR2, and may face each other in the first direction DR1.

According to some embodiments, the extension portions EX11, EX12, EX13, EX21, EX22, EX23, and EX3 and the connection portions CP11, CP12, CP13, CP21, CP22, and CP23 may be connected to each other to have a closed-loop shape. However, the sensing pattern HCP-C according to some embodiments is not limited thereto, and any one of the extension portions EX11, EX12, EX13, EX21, EX22, EX23, and EX3 and the connection portions CP11, CP12, CP13, CP21, CP22, and CP23 may be omitted, or additional extension portions and additional connection portions may be further included, but the embodiments of the inventive concept are not limited to any one embodiment.

According to some embodiments, in a plan view, a portion of the sensing pattern HCP-C may be located between the floating pattern FM and the sensing electrode patterns or between the floating pattern FM and the compensation lines BL1 and BL2, or may overlap the floating pattern FM.

The other portion of the sensing pattern HCP-C may be located between the floating pattern FM and the hole MH-C.

For example, the first extension portion EX11 and the second extension portion EX21 among the extension portions EX11, EX12, EX13, EX21, EX22, EX23, and EX3 of the sensing pattern HCP-C are located at the outermost periphery of the sensing pattern HCP-C, and thus, are arranged to be spaced apart from the hole MH-C with the floating pattern FM interposed therebetween, and the third extension portion EX12 and the fourth extension portion EX22 may overlap the floating pattern FM.

The rest of the extension portions EX13, EX23, and EX3 may be located between the floating pattern FM and the hole MH-C.

According to some embodiments, by increasing the area of the extension portions adjacent to the compensation lines BL1 and BL2 and sensing electrode patterns, it is possible to increase an amount of change in capacitance between the compensation lines BL1 and BL2 and the extension portions EX11, EX12, EX21, and EX22, and an amount of change in capacitance between the sensing electrode patterns and the extension portions EX11, EX12, EX21, and EX22. Accordingly, the reliability of a process of determining defects of an insulation layer including an organic matter, or determining defects of sensing electrode patterns may be improved.

Figure 10A:
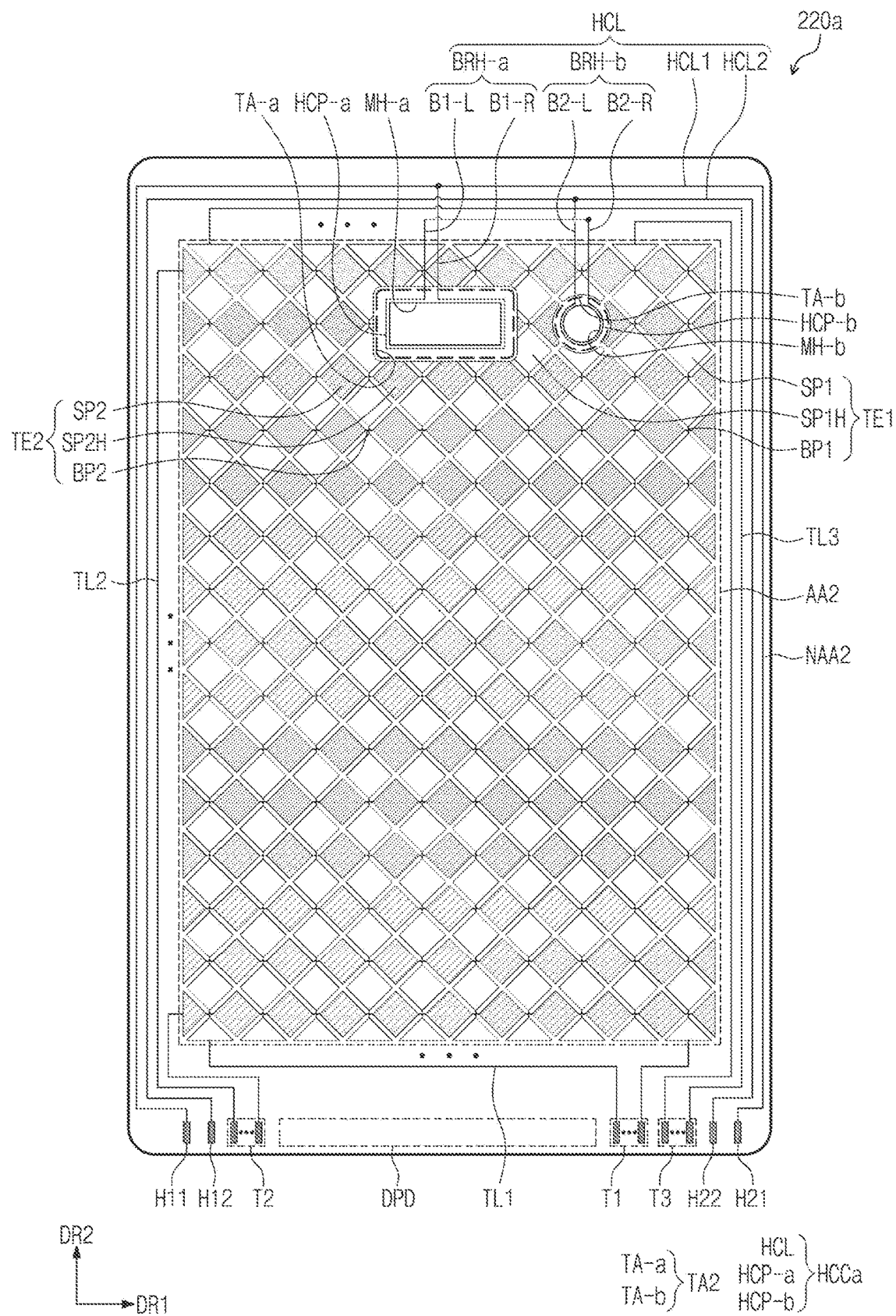
FIG. 10A is a plan view of an input sensor according to some embodiments of the inventive concept.
Figure 10B:
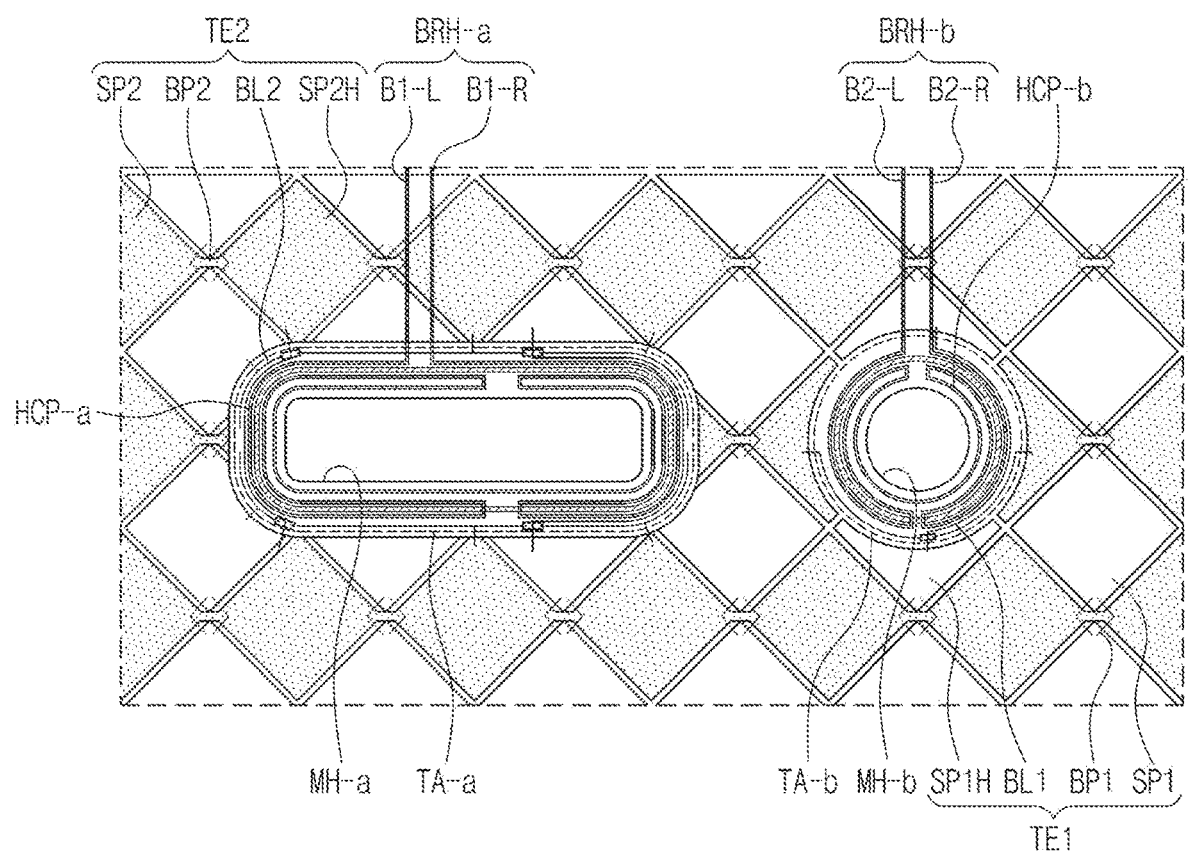
FIG. 10B is an enlarged view of an input sensor overlapping a signal transmission region according to some embodiments of the inventive concept.

FIG. 10A is a plan view of an input sensor according to some embodiments of the inventive concept. FIG. 10B is an enlarged view of an input sensor overlapping a signal transmission region according to some embodiments of the inventive concept. The same/similar reference numerals are used for the same/similar components as those described with reference to FIG. 3C to FIG. 5B, and redundant descriptions thereof will be omitted.

Referring to FIG. 10A and FIG. 10B, an input sensor 220*a* according to some embodiments includes a plurality of first sensing electrodes TE1, a plurality of second sensing electrodes TE2, a plurality of trace lines TL1, TL2, and TL3, and a plurality of sensing pads T1, T2, and T3.

A sensing circuit HCCa according to some embodiments may include a sensing line HCL, a first sensing pattern HCP-a, and a second sensing pattern HCP-b. The sensing line HCL may include a first connection line BRH-a, a second connection line BRH-b, a first routing line HCL1, and a second routing line HCL2. The first connection line BRH-a and the second connection line BRH-b may each include first lines B1-L and B2-L and second lines B1-R and B2-R.

The first sensing electrodes TE1 are arranged along the first direction DR1, and each thereof is extended along the second direction DR2. The first sensing electrodes TE1 may each include first main patterns SP1, first adjacent patterns SP1H, and first bridge patterns BP1.

The first main patterns SP1 are located in the second active region AA2. The first main patterns SP1 are arranged to be spaced apart from holes MH-a and MH-b. The first adjacent patterns SP1H are located adjacent to the sensing transmission region TA2. The area of one first adjacent pattern SP1H may be smaller than the area of one first main pattern SP1. The first adjacent pattern SP1H may have a shape in which a region overlapping the sensing transmission region TA2 is removed from the same rhombic shape as that of the first main pattern SP1.

The first bridge pattern BP1 may be located between two adjacent first main patterns SP1 to connect the two first main patterns SP1.

The second sensing electrodes TE2 are arranged along the second direction DR2, and each thereof is extended along the first direction DR1. The second sensing electrodes TE2 may each include second main patterns SP2, second adjacent patterns SP2H, and second bridge patterns BP2.

The second main patterns SP2 are located in the second active region AA2. The second main patterns SP2 are arranged to be spaced apart from the holes MH-a and MH-b. The second adjacent patterns SP2H are located adjacent to the sensing transmission region TA2. The area of one second adjacent pattern SP2H may be smaller than the area of one second main pattern SP2. The second adjacent pattern SP2H may have a shape in which a region overlapping the sensing transmission region TA2 is removed from the same rhombic shape as that of the second main pattern SP2.

The second bridge pattern BP2 may be located between two second main patterns SP2. The second main patterns SP2 and the second adjacent patterns SP2H may be provided in a shape of a single body.

In the input sensor 220*a* according to some embodiments, two holes MH-a and MH-b having different shapes from each other may be defined. A first hole MH-a may overlap a first transmissive region TA-a, and a second hole MH-b may overlap a second transmissive region TA-b. The first transmissive region TA-a and the second transmissive region TA-b may be surrounded by the second active region AA2.

According to some embodiments, the holes MH-a and MH-b may have different shapes from each other. For example, the first hole MH-a may have a rectangular shape with round corners, and the second hole MH-b may have a circular shape. However, the embodiments of the inventive concept are not limited thereto. When there are a plurality of holes formed in the input sensor 220*a*, the holes may have the same shape, and are not limited to any one embodiment.

Because the input sensor 220*a* according to some embodiments is provided with a plurality of holes MH-a and MH-b, a plurality of sensing patterns HCP-a and HCP-b corresponding thereto may be included.

For example, a first sensing pattern HCP-a may surround at least a portion of the first hole MH-a, and a second sensing pattern HCP-b may surround at least a portion of the second hole MH-b.

The first line B1-L of the first connection line BRH-a may be connected to one end of the first sensing pattern HCP-a and the second line B2-R of the second connection line BRH-b, and the second line B1-R of the first connection line BRH-a may be connected to the other end of the first sensing pattern HCP-a and the first routing line HCL1.

The first line B2-L of the second connection line BRH-b may be connected to one end of the second sensing pattern HCP-b and the second routing line HCL2, and the second line B2-R of the second connection line BRH-b may be connected to the other end of the second sensing pattern HCP-b and the first line B1-L of the first connection line BRH-a.

One end of the first routing line HCL1 is connected to a first pad H11, and one end of the second routing line HCL2 is connected to a second pad H12. The first pad H11 and the second pad H12 may be located on the left side with respect to a region in which the display pads DPD are located.

The other end of the first routing line HCL1 is connected to a third pad H21, and the other end of the second routing line HCL2 is connected to a fourth pad H22. The third pad H21 and the fourth pad H22 may be located on the right side with respect to the region in which the display pads DPD are located. The first pad H11 and the second pad H12 are arranged to be spaced apart from the third pad H21 and the fourth pad H22 with the display pads DPD interposed therebetween.

An electrical signal received through the first pad H11 may be introduced to the other end of the first sensing pattern HCP-a via the first routing line HCL1. Thereafter, an electrical signal output from the one of the first sensing pattern HCP-a is introduced to the other end of the second sensing pattern HCP-b, and is output to the second pad H12 via one end of the second sensing pattern HCP-b.

In the same manner, an electrical signal received through the third pad H21 may be introduced to one end of the first sensing pattern HCP-a via the first routing line HCL1. Thereafter, an electrical signal output from the other end of the first sensing pattern HCP-a is introduced to the other end of the second sensing pattern HCP-b, and is output to the fourth pad H22 via one end of the second sensing pattern HCP-b.

According to some embodiments, the sensing circuit HCCa includes the sensing patterns HCP-a and HCP-b each of which is connected to the sensing line HCL and formed as a closed line, so that even when a plurality of holes MH-a and MH-b are defined in the input sensor 220a, it is possible to easily perform a process of determining whether there is a crack in a region adjacent to the holes MH-a and MH-b, a process of determining whether an insulation layer including an organic matter is defective, and a process of determining whether sensing electrode patterns are defective.

Figure 11:
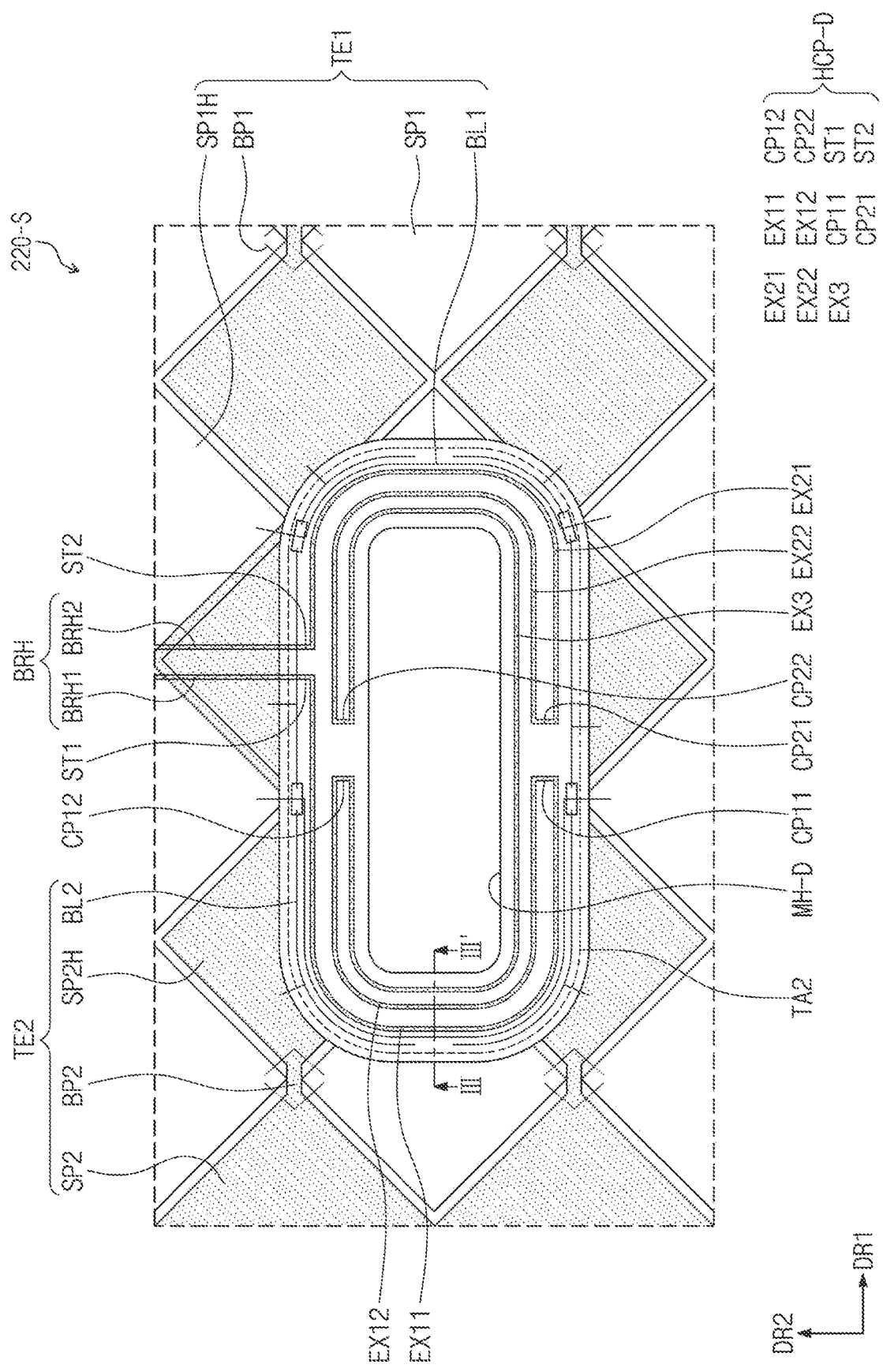
FIG. 11 is an enlarged view of an input sensor overlapping a signal transmission region according to some embodiments of the inventive concept.
Figure 12:
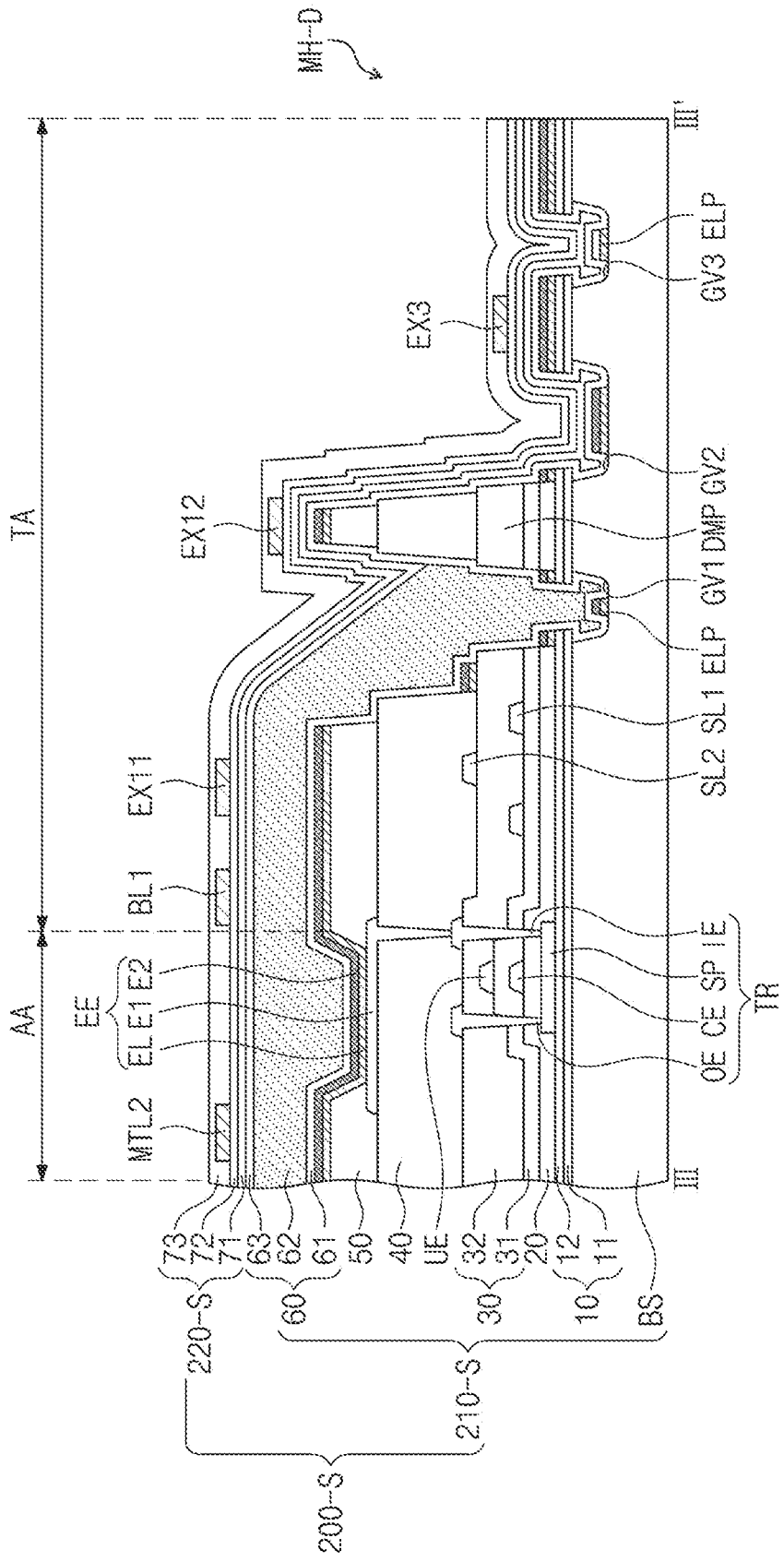
FIG. 12 is a cross-sectional view of an electronic panel according to some embodiments of the inventive concept.

FIG. 11 is an enlarged view of an input sensor overlapping a signal transmission region according to some embodiments of the inventive concept. FIG. 12 is a cross-sectional view of an electronic panel according to some embodiments of the inventive concept. FIG. 12 is a cross-sectional view taken along the line III-III' of FIG. 11. The same/similar reference numerals are used for the same/similar components as those described with reference to FIG. 4A and FIG. 4B, and redundant descriptions will be omitted. The components and differences described with reference to FIG. 5A and FIG. 7 will be mainly described.

Referring to FIG. 11 and FIG. 12, an electronic panel 200-S according to some embodiments may include a display unit 210-S and an input sensor 220-S.

Unlike the display unit 210 described with reference to FIG. 5A, the display unit 210-S according to some embodiments may not have the organic pattern YOC (see FIG. 5A) and the floating pattern FM (see FIG. 5A) for preventing separation of the organic pattern YOC.

In the input sensor 220-S according to some embodiments, a hole MH-D formed by passing through the input sensor 220-S may be defined. The hole MH-D according to some embodiments may have a rectangular shape extended in the first direction DR1. Each corner of the hole MH-D may have a round shape.

The input sensor 220-S may include an intermediate insulation layer 71 and first and second sensing insulation layers 72 and 73. The intermediate insulation layer 71 may be located on the front surface of an active region AA and a signal transmission region TA to cover a second inorganic layer 63 of an encapsulation layer 60.

A first sensing insulation layer 72 is located on the intermediate insulation layer 71. On the intermediate insulation layer 71, a first bridge patterns BP1 (see FIG. 3D) of a first sensing electrode TE1 may be located.

A second sensing insulation layer 73 may be located on the first sensing insulation layer 72. On the first sensing insulation layer 72, sensing electrode patterns and a sensing circuit HCC (see FIG. 3C) may be located.

The sensing circuit HCC according to some embodiments may include a sensing pattern HCP-D and a sensing line HCL (see FIG. 3C) connected to the sensing pattern HCP-D. The sensing line HCL may include a connection line BRH, a first routing line HCL1 (see FIG. 3C), and a second routing line HCL2 (see FIG. 3C).

The sensing pattern HCP-D according to some embodiments may include extension portions EX11, EX12, EX21, EX22, and EX3, connection portions CP11, CP12, CP21, and CP22, and protrusion portions ST1 and ST2. Patterns included in the sensing pattern HCP-D may correspond to the patterns included in the sensing pattern HCP-A described with reference to FIG. 7, and differences therebetween will be mainly described.

According to some embodiments, a structure in which the organic pattern YOC (see FIG. 5A) is omitted is included, so that in a plan view, a portion of the sensing pattern HCP-D may overlap the organic layer 62 of the encapsulation layer 60 inside the signal transmission region TA, and the other portion of the sensing pattern HCP-D may be spaced apart from the organic layer 62 of the encapsulation layer 60.

For example, the first extension portion EX11 may overlap the organic layer 62, and the third extension portion EX12 may overlap the dam portion DMP. In addition, the fifth extension portion EX3 may be located between the second recessed pattern GV2 and the third recessed pattern GV3.

According to some embodiments, because an insulation layer including an organic matter is omitted, it is possible to provide the electronic panel 200-S with relatively reduced defects which are generated in a process of forming the insulation layer including an organic matter.

According to some embodiments of the present invention, using a sensing circuit included in an input sensor, it may be possible to relatively easily determine whether or not there is a crack or the like in an electronic panel. In addition, using the sensing circuit, embodiments according to the present invention may relatively easily determine whether or not sensing electrode patterns included in the input sensor are defective and whether or not an insulation layer including an organic material is defective. Accordingly, it may be possible to relatively simplify a process of inspecting whether or not an electronic apparatus is defective.

Although aspects of some embodiments of the present invention have been described with reference to some embodiments of the present invention, it will be understood by those skilled in the art that various modifications and changes in form and details may be made therein without departing from the spirit and scope of the present invention as set forth in the following claims. Accordingly, the technical scope of the present invention is not intended to be limited to the contents set forth in the detailed description of the specification, but is intended to be defined by the appended claims, and their equivalents.

What is claimed is:

1. An electronic apparatus comprising:
a display unit including a base substrate having a signal transmission region, an active region surrounding at least a portion of the signal transmission region, and a peripheral region adjacent to the active region, and pixels on the base substrate and overlapping the active region;
an organic pattern overlapping the signal transmission region;
a floating pattern extended along an edge of the organic pattern; and
an input sensor including sensing electrodes each having a plurality of sensing electrode patterns which overlap the active region and a sensing circuit having a sensing pattern overlapping the signal transmission region and a sensing line connected to the sensing pattern, and on the display unit,
wherein:
a hole passing through the display unit and the input sensor is defined to correspond to the signal transmission region; and
in a plan view, a portion of the sensing pattern either overlaps the floating pattern or is between the sensing electrode patterns and the floating pattern, and the other portion of the sensing pattern is between the floating pattern and the hole, wherein the sensing pattern comprises extension portions each of which surrounds at least a portion of the hole and which are spaced apart from each other and connection portions for connecting the extension portions, wherein:

among the extension portions, a first group extension portion included in the portion includes a first extension portion surrounding a left side of the hole and a second extension portion surrounding a right side of the hole; and among the extension portions, a second group extension portion included in the other portion includes, in the plan view, a third extension portion between the first extension portion and the hole, a fourth extension portion between the second extension portion and the hole, and a fifth extension portion among the third extension portion, the fourth extension portion, and the hole.

2. The electronic apparatus of claim 1, wherein the connection portions comprise a first connection portion connected to one end of each of the first extension portion and the third extension portion, a second connection portion connected to one end of each of the second extension portion and the fourth extension portion and facing the first connection portion, a third connection portion connected to the other end of the third extension portion and one end of the fifth extension portion, and a fourth connection portion connected to the other end of the fourth extension portion and the other end of the fifth extension portion and facing the third connection portion.

3. The electronic apparatus of claim 2, wherein the sensing line comprises a first line connected to the other end of the first extension portion and a second line connected to the other end of the second extension portion.

4. The electronic apparatus of claim 3, wherein the input sensor comprises trace lines respectively connected to the sensing electrodes and pads and sensing pads connected to the sensing line and the trace lines, respectively, wherein the first line and the second line are connected to different pads.

5. The electronic apparatus of claim 2, wherein the first connection portion and the second connection portion cross the floating pattern.

6. The electronic apparatus of claim 2, wherein the sensing electrode patterns comprise main patterns and adjacent patterns having an area smaller than that of the main patterns and surrounding the hole, wherein the input sensor further includes a compensation line connected to the adjacent patterns spaced apart from each other having the hole interposed therebetween among the adjacent patterns and in the signal transmission region, wherein the first group extension portion is more adjacent to the compensation line than the second group extension portion.

7. The electronic apparatus of claim 6, wherein the sensing electrode patterns, the sensing pattern, and the compensation line are on the same layer.

8. The electronic apparatus of claim 1, wherein the sensing electrode patterns comprise a plurality of conductive lines crossing each other, wherein a sensing line overlapping the active region among the sensing lines includes a plurality of conducive lines crossing each other.

9. The electronic apparatus of claim 1, wherein the display unit comprises:

a circuit element layer including at least one transistor included in each of the pixels, and a dam portion overlapping the signal transmission region and surrounding the hole, and on the base substrate;

a display element layer including light emitting elements included in each of the pixels and connected to the at least one transistor, and on the circuit element layer; and an encapsulation layer including a first inorganic layer, a second inorganic layer, and an organic layer between the first inorganic layer and the second inorganic layer and having a boundary thereof defined by the dam portion, and covering the light emitting elements.

10. The electronic apparatus of claim 9, wherein the other portion of the sensing pattern is spaced apart from the organic layer in the plan view, and the portion of the sensing pattern overlaps the organic layer in the plan view.

11. The electronic apparatus of claim 9, wherein the input sensor comprises an intermediate insulation layer on the second inorganic layer, a first sensing insulation layer on the intermediate insulation layer, a second sensing insulation layer on the first sensing insulation layer, and a third sensing insulation layer on the second sensing insulation layer, wherein the organic pattern is between the intermediate insulation layer and the first sensing insulation layer, and the sensing electrode patterns are on the second sensing insulation layer and covered by the third sensing insulation layer.

12. The electronic apparatus of claim 11, wherein the floating pattern is on the first sensing insulation layer and covered by the second sensing insulation layer.

13. The electronic apparatus of claim 1, wherein the hole has any one of a quadrangular shape, a circular shape, and an elliptical shape.

14. The electronic apparatus of claim 1, wherein the signal transmission region comprises a panel transmission region and a second signal transmission region spaced apart from each other, wherein the hole overlaps the panel transmission region, and an additional hole passing through the display unit and the input sensor is defined to correspond to the second signal transmission region, wherein the input sensor further includes an additional sensing pattern connected to the sensing line and surrounding at least a portion of the additional hole.

15. The electronic apparatus of claim 14, wherein a shape of the hole and a shape of the additional hole are different from each other.

16. The electronic apparatus of claim 1, further comprising an electronic module overlapping the hole, wherein the electronic module includes at least one of a camera, a speaker, a light sensing sensor, or a heat sensing sensor.

17. An electronic apparatus comprising:

a display unit including a base substrate having a signal transmission region, an active region surrounding at least a portion of the signal transmission region, and a peripheral region adjacent to the active region, insulation layers on the base substrate, pixels in the active region, and an encapsulation layer including inorganic layers and an organic layer between the inorganic layers and covering the pixels; and an input sensor including sensing electrodes each having a plurality of sensing electrode patterns which overlap the active region and a sensing circuit having a sensing pattern overlapping the signal transmission region and a sensing line connected to the sensing pattern, and on the display unit, wherein a hole passing through the display unit and the input sensor is defined to correspond to the signal transmission region, and in a plan view a portion of the sensing pattern overlaps the organic layer, and the other portion of the sensing pattern does not overlap the organic layer, wherein the sensing pattern comprises extension portions each of which surrounds at least a portion of the hole and which are spaced apart from each other and connection portions for connecting the extension portions, wherein:

among the extension portions, a first group extension portion included in the portion includes a first extension portion surrounding a left side of the hole and a second extension portion surrounding a right side of the hole; and among the extension portions, a second group extension portion included in the other portion includes, in the plan view, a third extension portion between the first extension portion and the hole, a fourth extension portion between the second extension portion and the hole, and a fifth extension portion among the third extension portion, the fourth extension portion, and the hole.

18. The electronic apparatus of claim 17, wherein the sensing electrode patterns comprise main patterns and adjacent patterns having an area smaller than that of the main patterns and surrounding the hole, wherein the input sensor further includes a compensation line connected to the adjacent patterns spaced apart from each other having the hole interposed therebetween among the adjacent patterns and in the signal transmission region, wherein the portion of the sensing pattern overlapping the organic layer are more adjacent to the compensation line than the other portion of the sensing pattern.

19. The electronic apparatus of claim 18, wherein the sensing electrode patterns, the sensing pattern, and the compensation line are on the same layer.

* * * * *